(12) United States Patent
Tan

(10) Patent No.: US 8,161,120 B2
(45) Date of Patent: Apr. 17, 2012

(54) METHOD OF POPULATING A COLLABORATIVE WORKSPACE AND A SYSTEM FOR PROVIDING THE SAME

(75) Inventor: Eng Siong Tan, Singapore (SG)

(73) Assignee: Third Sight Pte. Ltd., Singapore (SG)

( * ) Notice: Subject to any disclaimer, the term of this patent is extended or adjusted under 35 U.S.C. 154(b) by 833 days.

(21) Appl. No.: 11/658,705

(22) PCT Filed: Jul. 27, 2005

(86) PCT No.: PCT/SG2005/000253
§ 371 (c)(1),
(2), (4) Date: Jan. 29, 2007

(87) PCT Pub. No.: WO2006/011857
PCT Pub. Date: Feb. 2, 2006

(65) Prior Publication Data
US 2009/0013043 A1    Jan. 8, 2009

(30) Foreign Application Priority Data
Jul. 30, 2004 (SG) ................ 200404383-2

(51) Int. Cl.
*G06F 15/16* (2006.01)
(52) U.S. Cl. .......... 709/206; 709/204; 709/207
(58) Field of Classification Search .......... 709/204, 709/205, 206
See application file for complete search history.

(56) References Cited

U.S. PATENT DOCUMENTS

| | | | |
|---|---|---|---|
| 5,513,126 A * | 4/1996 | Harkins et al. | 709/228 |
| 5,724,508 A * | 3/1998 | Harple et al. | 709/205 |
| 6,182,273 B1 | 1/2001 | Tarumi | |
| 6,195,091 B1 * | 2/2001 | Harple et al. | 715/751 |
| 6,507,865 B1 | 1/2003 | Hanson et al. | |
| 6,704,772 B1 * | 3/2004 | Ahmed et al. | 709/207 |
| 7,146,381 B1 * | 12/2006 | Allen et al. | 707/104.1 |
| 2002/0099775 A1 | 7/2002 | Gupta et al. | |
| 2002/0122543 A1 * | 9/2002 | Rowen | 379/93.01 |
| 2003/0135565 A1 * | 7/2003 | Estrada | 709/206 |
| 2003/0167310 A1 | 9/2003 | Mody et al. | |
| 2004/0122835 A1 | 6/2004 | McKibben et al. | |

FOREIGN PATENT DOCUMENTS
WO    WO 01/95166 A2    12/2001
* cited by examiner

*Primary Examiner* — Mohamed Ibrahim
(74) *Attorney, Agent, or Firm* — Faegre Baker Daniels LLP

(57) ABSTRACT

A method of populating a collaborative workspace based on an electronic message is disclosed herein. An embodiment of the present invention is operative to post-process an outgoing email after being assigned to a workspace. Further, a message identifier is computed to uniquely identify the e-mail and then the method identifies and obtains core elements of workspace, namely, members, discussion, files, events and their relationships before populating these elements into the workspace data stores for subsequent contextual search and navigation. The outgoing e-mail is also annotated to encapsulate additional information. The described embodiment also suggests pre-processing incoming emails to exploit the annotation to append a Context-bar to allow quick and direct access to the contextual workspaces associated with the email. A system for providing a collaborative workspace is also suggested.

55 Claims, 15 Drawing Sheets

METHOD OF POPULATING A COLLABORATIVE WORKSPACE AND A SYSTEM FOR PROVIDING THE SAME

CROSS-REFERENCE TO RELATED APPLICATIONS

This application is a nationalization of PCT Patent Application Ser. No. PCT/SG2005/000253, filed Jul. 27, 2005, which claimed priority to Singapore Application No. 200404383-2, filed Jul. 30, 2004, the disclosures of which are expressly incorporated herein by reference.

BACKGROUND AND FIELD OF THE INVENTION

The present invention relates to a method of populating a collaborative workspace and a system for providing a collaborative workspace.

The use of electronic communications and digital documents is pervasive in today's information age. The emergence of electronic data communication has enabled organisations to go both virtual and global. Employees, vendors, and partners alike can work closely together or collaborate on projects without being constrained by physical or geographical boundaries. Collaborative software applications such as IBM Lotus Quickplace™ and Microsoft Sharepoint Team Services™ have been created to facilitate such collaboration activities that revolve around communications, information and documents sharing, and coordination of activities and events between groups of individuals. Such applications typically include tools to coordinate information-sharing e.g. use of shared folders), communications (e.g. threaded discussions forums), team management (e.g. contacts and tasks) and event management (e.g. calendars) related to a project.

However, despite its availability, such collaborative applications have not gained widespread use. This can be attributed to the fact that prior art for collaborative applications have focused primarily on the collaboration technology (faster response, more product features, support more simultaneous users) but such applications are tedious to set-up.

For example, a collaborative application for setting up a group workspace conventionally requires the following pre-collaboration set-up to be performed by a workspace initiator before any collaboration activity can begin:
(a) Create Workspace,
(b) Add Members, assign rights, and send invitations (usually via e-mail),
(c) Upload File/Documents,
(d) Send Discussions and
(e) Initialize Calendar.

Upon completion of these steps, the workspace initiator must then wait for each invited member to:
(f) Read e-mail invitation,
(g) Accept Invitation,
(h) Navigate to collaboration site,
(i) Successfully download and install any software if required, and finally
(j) Login and Participate.

While such steps may be considered the "norm" as they are virtually standard requirements in collaborative groupware workspace applications, they incur the drawback of high-overheads since pre-meditated set-up is required before the first collaboration action can occur through the workspace applications.

The above steps are onerous especially when compared to the normal work practice of communicating and sharing information through electronic mail (or e-mail), and thus it has been proposed to adapt known collaborative applications to work with e-mail applications to reduce the set-up time. For example, Sharepoint™ enables users to collaborate on files attached to Microsoft Outlook™ by creating workspaces based on the file attachment. However, this is inflexible and has its limitations.

Further, the use of e-mails as a collaborative tool has further problems since e-mails are designed as a simple store-and-forward messaging system. A first drawback is spam e-mails, or the predominance of "junk" mails in one's electronic inbox, which is a major contributor to information overload in e-mail systems. To resolve this, a typical solution involves the implementation of spam filters that detects spam e-mail characteristics, based either on user feedback, content analysis, Bayesian computations, or lists of email addresses or domains where emails originating from any member of these lists are always permitted through (so-called "white lists") or always blocked (so-called "black lists"). However, prior art solutions do not address the problem of "occupational spam", or useless e-mails from trusted parties. Examples include e-mails containing jokes from colleagues and friends, as well as the non-judicious excessive abuse of the "CC" feature in e-mail. Such e-mails are generally ignored by conventional spam filters, for fear of generating "false rejects". This drawback is significant, as occupational spam has been estimated to be a significant proportion of total corporate e-mail.

A second drawback of using e-mail as a collaboration tool is the lack of structure and context in the user interface to facilitate collaboration activities such as finding names of participants to a workgroup, documents, projects and timelines. Typical e-mail interfaces (for e.g. Microsoft Outlook™ and Lotus™ from IBM) are designed primarily for convenient viewing of incoming e-mails rather than for collaboration purposes and thus have their limitations.

Prior art for e-mail retrieval also involves the use of freetext search, such as Gmail by Google. However, freetext search does not directly support the type of structured search frequently needed for group collaboration, such as "What are my meetings for next week?" or "Who is attending today's meeting and has not yet read the design document?".

As it is appreciated, both conventional workspace collaborative applications and use of e-mail systems as a collaborative tool have their limitations and thus, there is a need for a new system that addresses the drawbacks highlighted above.

SUMMARY OF THE INVENTION

In general terms, the present invention relates to method and system for populating collaborative workspaces with information from electronic mail messages.

According to a first aspect of the present invention, there is provided a method of populating a collaborative workspace with a plurality of user-specified elements of an electronic mail message, the method comprising the steps of:
(i) assigning the electronic message to a collaborative workspace based on the said electronic message, the workspace including a plurality of data groups accessible by a sender and/or one or more recipients of the electronic mail message;
(ii) automatically identifying and obtaining each user-specified element of the plurality of user-specified elements from the electronic mail message, and (iii) automatically associating each user-specified element with a said data group to enable the sender and/or the one or more recipients to collaborate on the user-specified elements.

An advantage of the described embodiment of the present invention is that the proposed method alleviates a need of the tedious setting-up and preparatory work of populating a workspace before a plurality of users (sender and recipients of the electronic mail message) can collaborate on the data (i.e. the user-specified elements). The normal e-mail can thus be "transformed" into automated steps for updating and accessing the workspace, thus removing both the high overheads associated with workspace set-up and management as well as the need for pre-meditated planning. Further, since the assigning of the electronic mail message is based on the mail message itself, the user is thus not restricted to the existence of a particular user-specified element in order to create a workspace (i.e. the association is regardless of the message contents) as the presence of an electronic mail message is inherent. Further, the mail message itself can also serve as an identifier within the workspace and in relation to other workspaces, when there is a plurality of workspaces, and thus if one user-defined element is associated with two workspace's data groups, the user-defined element can be identified based on the mail message.

Typically, the workspace is an existing workspace, or alternatively, step (i) of the method further comprises the step of creating a new collaborative workspace, the electronic mail message being assigned to the new workspace.

Preferably, the workspace is categorised as a shared workspace in which the user-defined elements within the workspace can be collaborated on by the sender and one or more recipients of the electronic mail message, and a private workspace in which the data groups within the work space can be collaborated on only by the sender of the electronic message, and the method further comprises the step of: selecting whether to assign the electronic message to a shared workspace or to a private workspace. Further, there may also be an option to select whether to categorise the electronic mail message as a shared message within a said shared workspace in which the user-defined elements can be collaborated on by the sender and the one or more recipients, or as a private message within a said shared workspace in which the user-defined elements can be collaborated on only by the sender of the electronic mail message.

Preferably, the method further comprises the step of generating a message identifier based on the electronic message, and the method may further comprise the step of storing the identifier in association with each user-specified element after each element has been associated with a data group. This identifier can thus be used to perform a contextual search based on one user-specified element to obtain the rest of the user-specified elements associated with the identifier (thus belonging to the same e-mail message).

The method may further comprise the step of associating the identifier with the workspace to which the electronic message is assigned.

The method is applicable to both a sending and a receiving party. Thus, the existing workspace or the newly created workspace may be stored in a computer system local to the sender of the electronic message, and the assigning step may be performed at the computer system local to the sender of the electronic message. In this case, the method may include the step of prompting the sender of the electronic message to select whether to assign the electronic message to a workspace, prior to the assigning step.

Typically, the electronic mail message is transmitted over a communications network to the one or more recipients which may be the Internet or an Intranet.

Preferably, the plurality of user-specified elements includes electronic mail addresses of the sender and/or one or more recipients, and the plurality of data groups may include a people data group and step (iii) further comprises the step of associating the addresses of the sender and/or one or more recipients with the people data group.

Further, the plurality of user-specified elements may include a message body of the electronic mail message, and the plurality of data groups may include a discussion data group, and step (iii) may further comprise the step of associating the message body of the electronic mail message with the discussion data group.

The message body may include new text yet to be associated with the discussion data group and old text already associated with the discussion data group, the method further comprising the steps of identifying and obtaining the new text, and associating the new text with the discussion data group. In this respect, the identifying step may comprise the step of checking the format of the message body to identify the new and old text in the message body.

Typically, the plurality of user-specified elements includes files attached to the electronic message, and the plurality of data groups includes a file data group, and step (iii) further comprises the step of associating the files with the file data group. Alternatively or in addition, the plurality of user-specified elements may include hyperlinks contained in the message body of the electronic message, and the plurality of data groups may include a file data group, and step (ii) may further comprises the step of associating the hyperlinks with the file data group.

Also, the plurality of user-specified elements may include time and/or date information in the message body of the electronic message, and the plurality of data groups includes an event data group, and step (ii) may further comprise the step of associating the time and/or date information with the event data group.

In the case of the method being performed at a recipient's computer system, the assigning step is performed at a recipient computer system local to the one or more recipients of the electronic message after the electronic message is received by the recipient computer system.

Advantageously, the method further comprises the step of, prior to the transmission at the sender's computer system, annotating the electronic mail message with a first annotation field which allows the recipient computer system to automatically assign the received electronic mail message to a collaborative workspace local to the recipient computer system upon receipt of the electronic mail message at the recipient computer system, the said workspace having a plurality of data groups with each user-specified element of the electronic message being automatically associated with respective ones of the said plurality of data groups.

The method may further comprise the step of creating a new collaborative workspace based on the first annotation field and wherein the electronic mail message is assigned to the newly created collaborative workspace. The method may also comprise, prior to the assigning of the electronic message to the collaborative workspace at the recipient computer system, checking automatically whether the electronic message is annotated with the first annotation field.

Preferably, the method further comprises the step of replacing the first annotation field of the electronic message with a context bar for directing the one or more recipients of the electronic message to the local collaborative workspace containing the user-specified elements, the context bar being viewable together with the electronic message by the one or more recipients.

Advantageously, the context bar includes a hyperlink pointing directly to the collaborative workspace.

The method may further comprise the step of applying a set of heuristic rules to the received electronic message to automatically determine whether the message is to be assigned to a workspace, if the electronic message is not annotated with the additional information. The rule may specify that the method further comprises the steps of automatically identifying and obtaining selective user-defined elements of the electronic mail message, and checking whether the selected user-defined elements has been previously assigned to an existing workspace, and assigning the electronic mail message to the existing workspace if the heuristic rules determines that the selected user-defined has already been previously assigned.

Advantageously, the heuristic rules are defined by the one or more recipients of the electronic mail message.

The method may further comprise the step of prompting the one or more recipients to select whether to assign the electronic message to a selected workspace or to create a new workspace for assigning the electronic message, if the heuristic rules cannot automatically determine that the message is to be assigned to a collaborative workspace.

Preferably, the method may further comprise the steps of, prior to the transmission, annotating the electronic mail message with a second annotation field at the sender's computer system which allows recipients unable to create the local collaborative workspace based on the first annotation field to still collaborate the user-specified elements based on the second annotation field. The second annotation field may include a hyperlink to direct the one or more recipients to a website remote from the recipient computer system and which hosts the collaborative workspace to enable the one or more recipients to still collaborate on the user-specified elements.

Advantageously, the method further comprises the step of generating a filtering identifier based on the assigned workspace of the electronic message, and annotating the filtering identifier to a selected user-specified element of the electronic message.

The method may further comprise the step of filtering the electronic message to appropriate electronic mail client folders based on the filtering identifier for retrieval and viewing by the one or more recipient. The selected user-specified element may be a subject field of the electronic mail message, and the filtering identifier may be annotated to the subject field.

The method is particularly advantageous when there is a plurality of electronic mail messages such that the method further comprises the step of assigning each electronic mail message to respective collaborative workspaces according to subject matter of the electronic messages. In this case, a message identifier of an electronic message may be associated with the plurality of data groups of a said workspace to which the electronic message is assigned.

Each data group in the workspace may be viewable simultaneously by the sender and/or the one or more recipient of the electronic mail message. The plurality of data groups may be associated with a data storage arranged to store the plurality of user-defined elements associated with respective ones of the plurality of data groups.

Advantageously, the assigning step is performed automatically to reduce manual intervention. Preferably, the method further comprises the step of selecting a workspace from a plurality of workspaces prior to the assigning step.

In a second aspect of the invention, there is provided a method of managing a collaborative workspace assigned with a plurality of electronic mail messages, each mail message having a plurality of user-specified elements, the workspace having a plurality of data groups with each user-specified element being associated with a data group, the method comprising the steps of:
(i) generating an unique message identifier for each electronic message, and
(ii) storing the identifier in association with each user-specified element of the said electronic message.

The message identifier links each user-element contextually (since all the user-elements of the same email have the same identifier), and thus, when a search is made for a particular element of a electronic message, the rest of the elements related to the electronic message can be identified in accordance with the message identifier. In this way, a contextual search can be conducted.

Preferably, the method further comprises the steps of selecting a user-specified element, and automatically obtaining the message identifier stored in association with the selected user-specified element and identifying the rest of the user-specified elements which has the same message identifier.

Advantageously, the identifier may be used to obtain information about a user-specified element quickly and thus the method may further comprise the steps of selecting first said user-specified element within a workspace, automatically obtaining corresponding message identifiers stored in association with the first said user-specified element, and identifying a first list of mail messages within the workspace which are associated with each of the corresponding message identifiers.

Preferably, when two user-elements are involved, the method may further comprise the steps of: identifying a second said user-specified element, determining the presence of the second user-specified element in the first list of mail messages; identifying a second list of mail messages based on the presence of the second user-specified element in the first list of mail messages; and obtaining a number of different message identifiers in the second list of mail messages.

Typically, the plurality of user-specified elements includes electronic mail addresses of a sender and/or of one or more recipients of the electronic mail message, a message body of the electronic mail message, files attached to the electronic message, and time and/or date information in the message body of the electronic message.

In accordance with a third aspect of the invention, there is provided a method of processing an electronic mail message to be sent from a sender to a recipient, the method comprising the steps of:
(i) prompting the sender to select or create a filtering identifier to associate with the electronic mail message, and
(ii) transmitting the identifier in association with the electronic mail message.

As will be apparent from the described embodiment, the filtering identifier can thus be used by the recipient to filter the message and direct the message to appropriate folders for retrievable/viewing by the recipient in a more accurate manner.

More specifically, the method may comprise the step of assigning the electronic message to a collaborative workspace having a plurality of data groups prior to the transmitting step (ii), the plurality of data groups being accessible by the sender and/or the recipient, and wherein the identifier is based on the workspace's name.

In the case of a mail message being assigned to more than one workspace, then the use of the filtering identifier can identify the different workspaces to which the mail message is assigned.

Preferably, the electronic mail message includes a plurality of user-specified elements, each element being associated with a data group to enable the sender and/or the recipient to collaborate on the user-specified elements.

The identifier may be tagged to a subject field of the electronic mail message.

The third aspect can also be adapted for use at the recipient and which forms a fourth aspect of the invention, in which there is provided a method of processing a received electronic mail message having a plurality of user-specified elements and a filtering identifier, the method comprising the steps of:
(i) identifying and obtaining the filtering identifier, and
(ii) appending the identifier to a selected user-specified element of the received electronic mail message.

At the receiving end, the filtering identifier is thus appended to a selected user-specified element and thus a conventional e-mail application can be configured to look for the identifier to suitably filter the e-mail.

Preferably, the selected user-specified element is the subject field of the received electronic message.

The method may further comprise the step of assigning the electronic message to a collaborative workspace having a plurality of data groups prior to the transmitting step (i), the plurality of data groups being accessible by the sender and/or the recipient, and wherein the identifier is based on the workspace's name. Also, the electronic mail message may include a plurality of user-specified elements, each element being associated with a data group to enable the sender and/or the recipient to collaborate on the user-specified elements.

The present invention also relates to a non-transitory computer-readable medium on which is stored a program module comprising instructions which, when executed by a computer, perform the above described methods.

Further, the present invention also relates to apparatus (systems) for performing the above described methods, including a system for providing a collaborative workspace.

Other features and advantages of the present invention will become apparent from the following detailed description of a preferred embodiment of the invention, taken in conjunction with the accompanying figures.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

1. Exemplary Operating Environment

Figure 1:
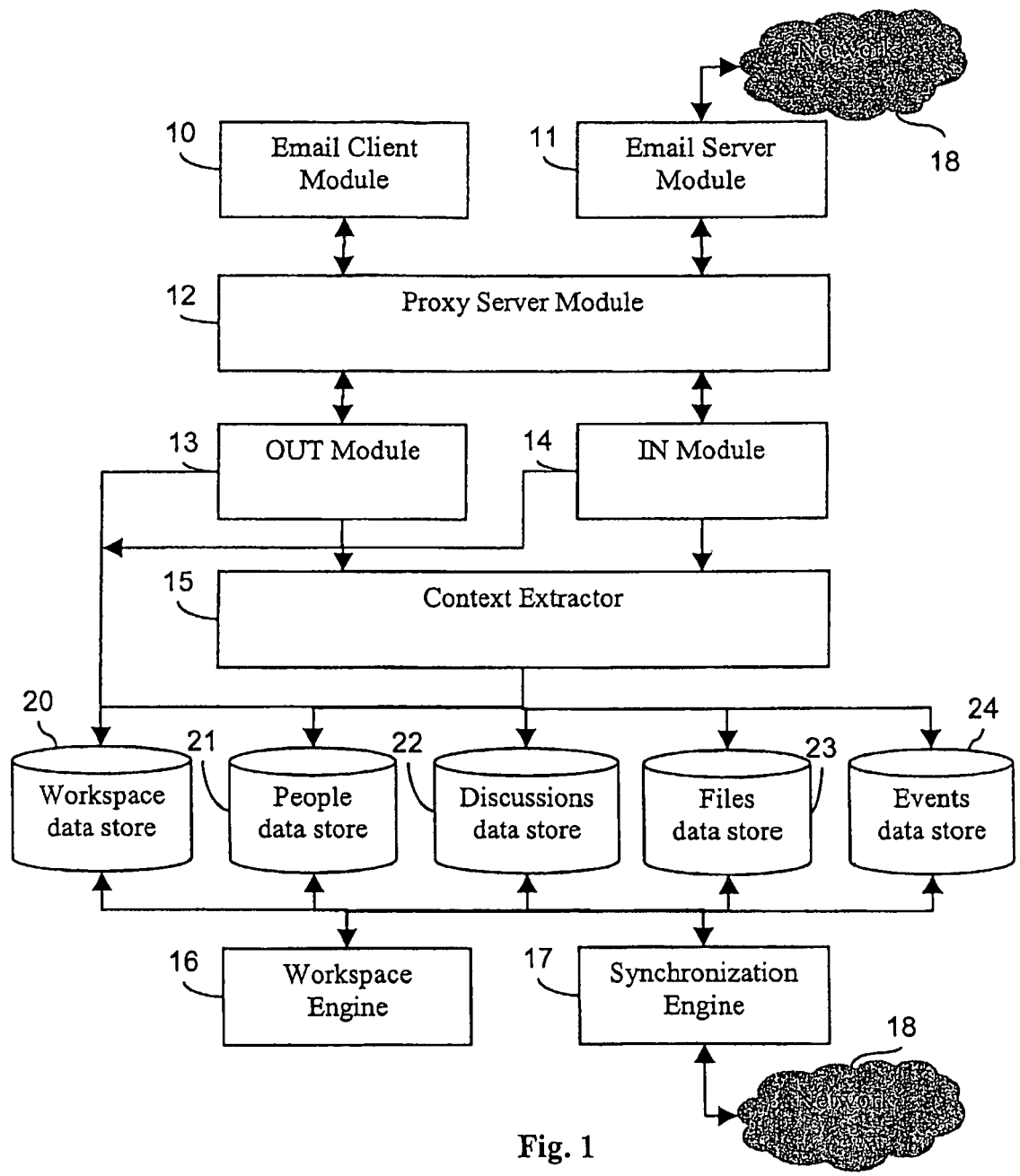
FIG. 1 is a block diagram providing an overview of a user's operating environment according to a preferred embodiment of the present invention.

FIG. 1 is a block diagram illustrating an architecture overview of a user's operating system according to a preferred embodiment of the present invention. The system comprises an electronic mail (e-mail) client module 10, an e-mail server module 11, a proxy server module 12 linked to the client and server modules 10,11, an OUT module 13 linked to the proxy server module 12 and an IN module 14 also linked to the proxy server module 12. The system further comprises a context extractor 15 which receives data from the OUT and IN modules 13,14 and data stores for user-defined elements of the e-mail including Workspace, People context, Discussion context, Files context, and Events Context 20, 21, 22, 23, 24. All these data stores are then linked to a workspace engine 16 and a synchronisation engine 17.

The e-mail server module 11 interfaces with a communications network 18 to receive and send e-mail messages over the network 18, which is in the form of the Internet in the present embodiment. The proxy server module 12 interfaces with both server and client modules 11,10 and functions as a proxy to receive outgoing e-mails from the e-mail client module 10, processes the e-mails and then sends the processed e-mails to e-mail server module 11 for transmission over the network 18. The processing of the e-mails also involves post-processing by the OUT module 13, the details of which will be elaborated later.

The proxy server module 12 also receives incoming e-mails from e-mail server module 11 (from the network 18), processes the e-mails before sending the processed e-mails to e-mail client module 10 for retrieval and viewing by the user. The e-mail client module 10, which can be a conventional e-mail client interface, interacts directly with the user as well as interfaces with the proxy server module 12 to send and receive e-mails on behalf of the user. The IN module 14 also performs pre-processing on the e-mails received from the e-mail server module 11, the details of which will be explained later.

Context extractor 15 obtains user-specified elements from the e-mails processed by the OUT and IN modules 13,14 for assigning to different stores 20,21,22,23,24 whereas Workspace engine 16 provides an interface to users to facilitate access to workspace data and context. The workspace engine 16 also includes a contextual search algorithm to carry out user's search requests.

The synchronisation engine 17 performs periodic data synchronisation between data stores of a local user system and remote data stores on another user system via a communications network 18.

The preferred embodiment of the present invention also provides for a relay server located remotely from any user to function as a relay station to facilitate data synchronisation between a plurality of user systems that is not connected via a common communications network at all times.

Figure 2:
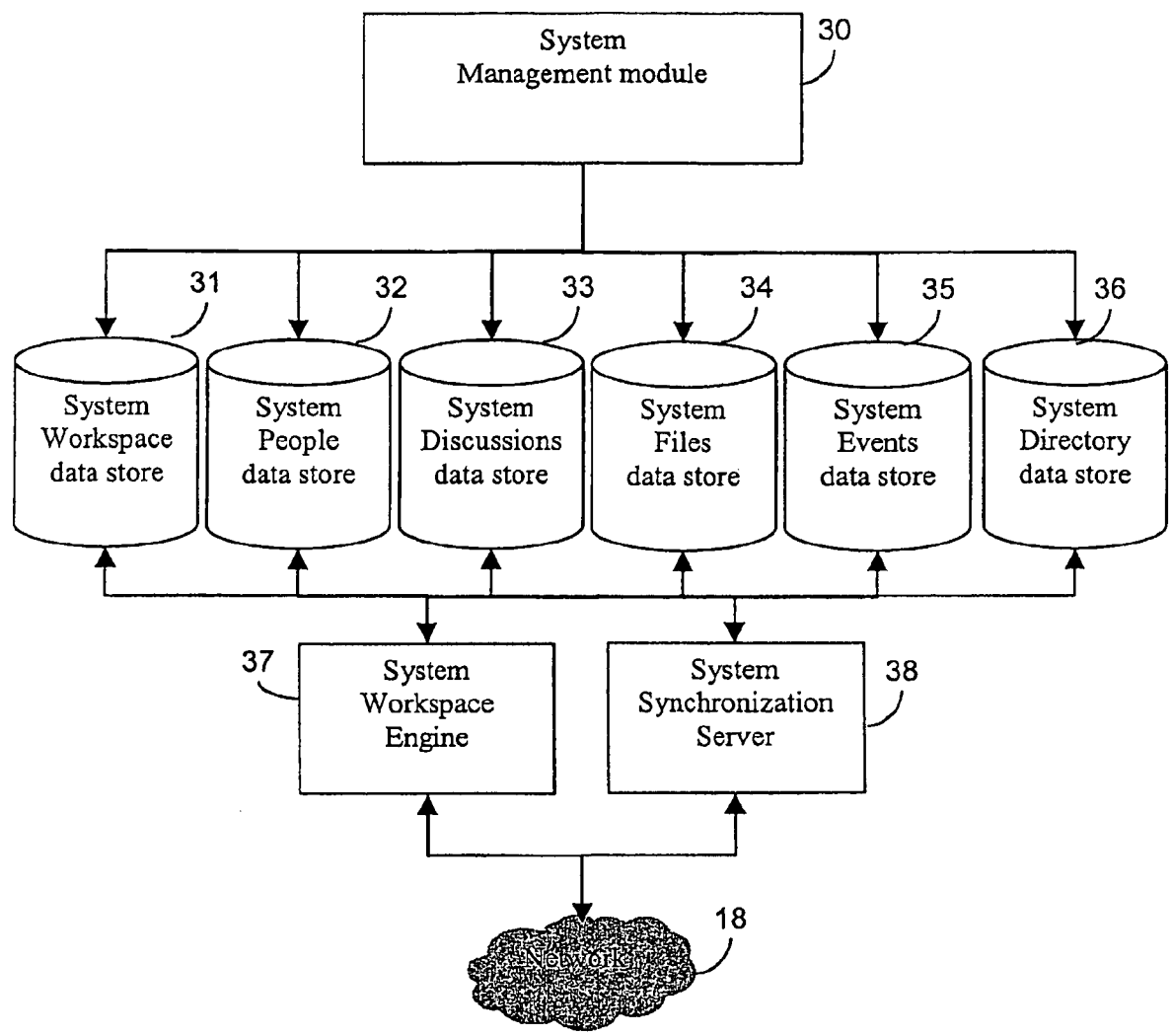
FIG. 2 is a block diagram of a relay server according to a preferred embodiment of the present invention.

FIG. 2 is a block diagram illustrating an architecture overview of the relay server's system. The system comprises a system management module 30, system data stores for Workspaces, People context, Discussion context, Files context, Events context and Directory 31, 32, 33, 34, 35, 36. Further, the system includes a system workspace engine 37 and system synchronisation engine 38 which interfaces to the other user systems and synchronises data stores via a communications network 18.

The functions of each module will now be described by using examples of how an outgoing e-mail and an incoming e-mail to/from the communications network 18 is processed.

2. Automated Workspace Update Through Post-Processing of an Outgoing E-Mail

After a user (i.e. the sender in this case) has composed an e-mail to be transmitted to a recipient, the e-mail client module 10 of FIG. 1 sends the composed e-mail to the proxy server module 12 which initiates the post-processing actions by passing the outgoing e-mail to OUT module 13 for processing.

Figure 3:
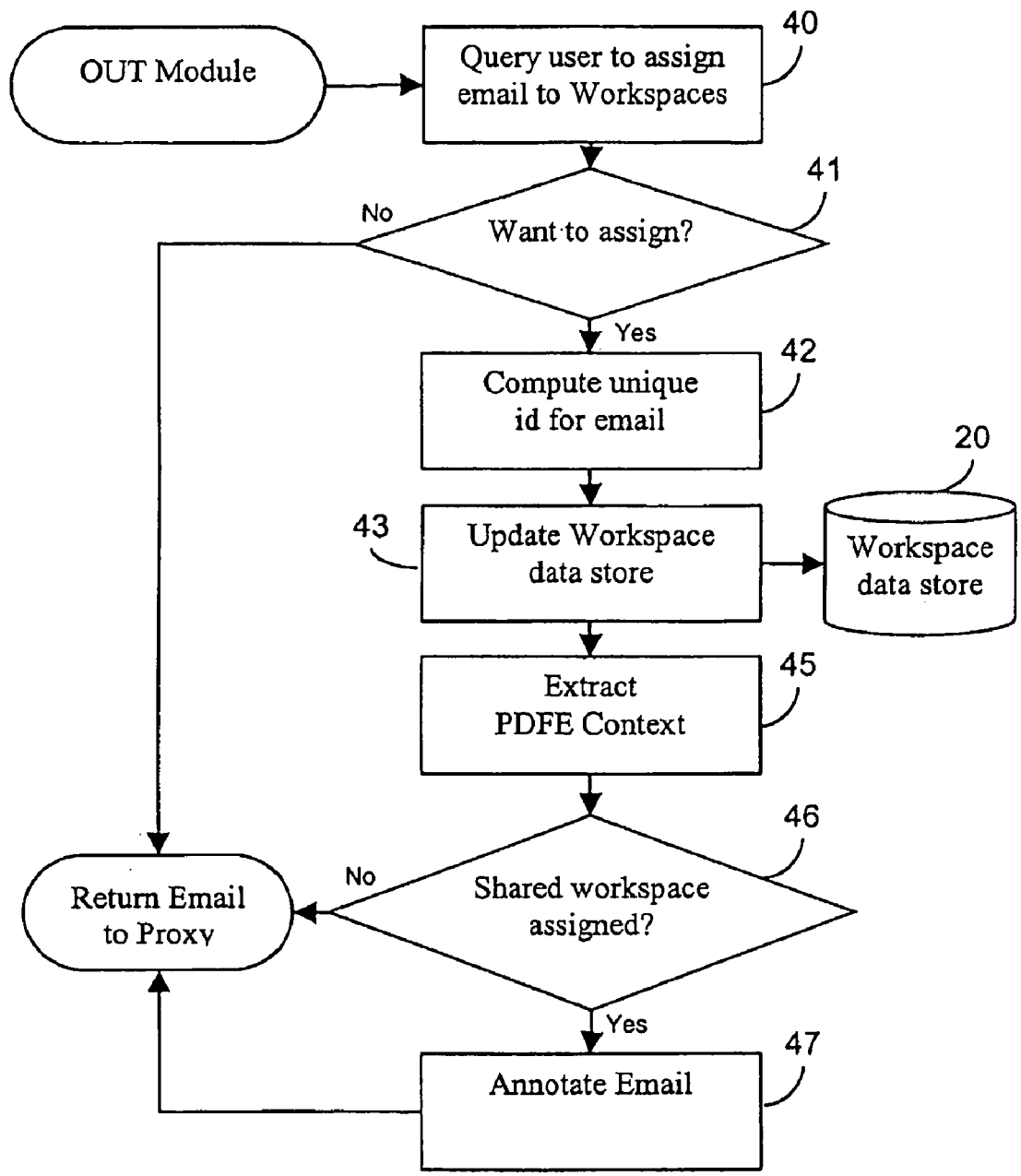
FIG. 3 is a flowchart describing post-processing steps of an outgoing e-mail after processing by the e-mail client module of FIG. 1 and prior to its transmission.
Figure 4A:
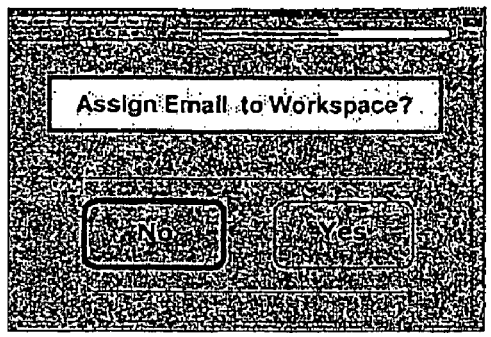
FIG. 4a illustrates an example of a user interface at step 41 of FIG. 3 prompting a user whether to assign an outgoing e-mail to a workspace.

FIG. 3 shows the processing steps of the OUT module 13 upon receiving the e-mail from the proxy server module 12. The sender is first prompted at step 40 whether the e-mail is to be assigned to any workspace. An example of a user prompt is depicted in FIG. 4a and which is adapted to require only a one-click reply. If the user responds to user prompt by clicking "No" which indicates that the e-mail should not receive any special handling (i.e. no assignment to workspace is needed), then no further post-processing is necessary and the e-mail is returned to the proxy server module 12 for onward transmission to the recipient through the communications network 18.

Figure 4B:
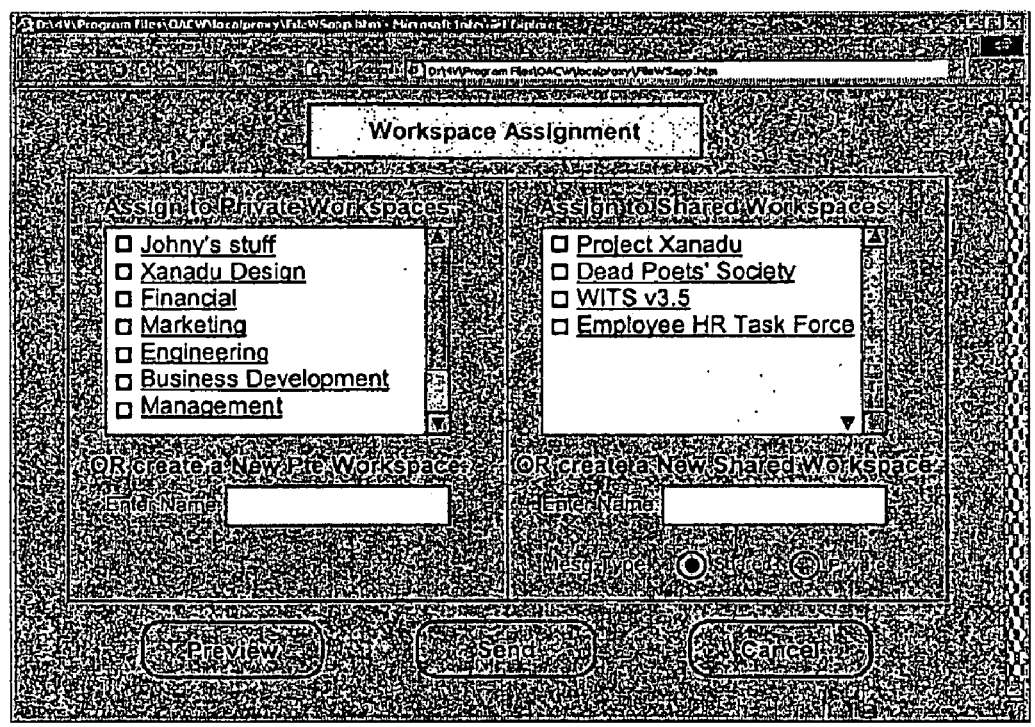
FIG. 4b illustrates an example of a user interface to select type of workspace assignment.

On the other hand, if the user responds to the prompt by clicking "Yes", the OUT module 13 generates another user prompt to allow the user to assign the e-mail to an existing workspace or to a newly created workspace. FIG. 4b shows an example of this further prompt which displays workspace-name listings of existing shared and private workspaces for easy selection, as well as means for specifying new shared and private workspaces to be assign to the current e-mail Shared workspaces are workspaces accessible by a selected group of individuals or participants and include (i) a number of data stores for storing content such as documents to be shared, discussion threads to record communication, member list and information for team management and events for time-based coordination, and (ii) tools to support collaboration activities such as tools for searching, adding/deleting team members, or day/week/month calendar viewing of events. In addition or alternatively, the user may assign the e-mail to one or more existing Shared workspaces, by checking on checkboxes corresponding to the names of the Shared workspace names that the user wants to assign to. Also, the user may assign the e-mail to a new Shared workspace by creating a new Shared workspace name. In addition, the user may specify whether the e-mail within the Shared workspace is a shared or a private message. A shared Message within a Shared workspace is shared with all members within the Shared workspace. A Private message within a Shared workspace can only be viewed and accessed by the user and no others. This feature allows the sender to keep confidential information, such as tender price of a project, within the same project workspace but deny the information to be shared by other members (i.e. recipients of the e-mail). In this way, information relating to a specific project can be managed better since sensitive information belonging to a project does not need to be separately stored, thus allowing a user to consolidate all shared and private e-mails that are project-related into one single contextual workspace.

Private workspaces are shared workspaces that are restricted to just one member. The user may assign the e-mail to one or more existing private workspaces by checking on checkboxes corresponding to names of the private workspaces. In addition or alternatively, the user can assign the e-mail to a brand new private workspace, by creating a new private workspace name.

It will be appreciated that, with the described embodiment, assignment of e-mails to workspaces is almost transparent and the user can use his existing e-mail system as per normal. Thus, the user can continue the familiar work practice of using existing favourite e-mail clients and e-mail application servers but at the same time use his e-mails as a collaboration tool as will be further described below.

2a. Computing Unique ID for the E-Mail

With reference to FIG. 3, after workspace assignment is performed, the system computes an unique identification code for the e-mail at step 42 that will be used throughout the system as an identifier (ID) for this e-mail.

In the present embodiment, this unique identifier is computed using known algorithms such as MD5 (message digest) that takes as input a message string derived from the e-mail's content and produces as output a unique 128-bit message digest or an electronic "fingerprint" of the e-mail. In the present embodiment, the message string is derived from the e-mail by concatenating the various fields in the e-mail in this order:

"FROM:", e-mail address of the sender of the e-mail,
"TO:", each e-mail address in the e-mail's TO field, in order of their listing,
"CC:", each e-mail address in the e-mail's CC field, if any, in order of their listing,
"BCC:", each e-mail address in the e-mail's BCC field, if any, in order of their listing,
"DATE:", the data of the e-mail,
"SUBJECT:", the subject text of the e-mail, if any,
"Message-Id:", the message ID of the e-mail,
"BODY:", the entire body text of the e-mail, if any,
"FILES:", names of attachment files, if any.

It should be apparent that other schemes of computing an unique ID for the e-mail are possible.

2b. Update of Workspaces Data Store

The system then updates the Workspaces data store to reflect the assignment of the e-mail to the workspaces at step 43. In the present embodiment, the Workspaces data store 20 is structured as a series of (Workspace-Name, Workspace-Type, Message-Id, Message-Type and Attribute-List) tuples, where Workspace-Name is the name of the workspace, Workspace-Type is "private" or "shared" as explained earlier, Message-Id is the unique id of the message, Message-Type is "private" or "shared", and Attribute-List is a list of Attribute-Name and Attribute-Value pairs.

The update step 43 may also comprise the step of adding one tuple for each workspace specified by the user, with Workspace-Name and Workspace-Type assigned according to each workspace's name and type, the Message-Id assigned as the value computed in step (step 42) and Message-Type assigned according to the message type specified by the user. The system then proceeds to extract the other aspects of context from the e-mail at step 45.

FIGS. 5a to 5d are flowcharts depicting process flows for identifying and obtaining the user-defined elements from the e-mail which is performed by the context extractor 15 of FIG. 1.

2c. People Context Extraction

Figures 5A, 5B:
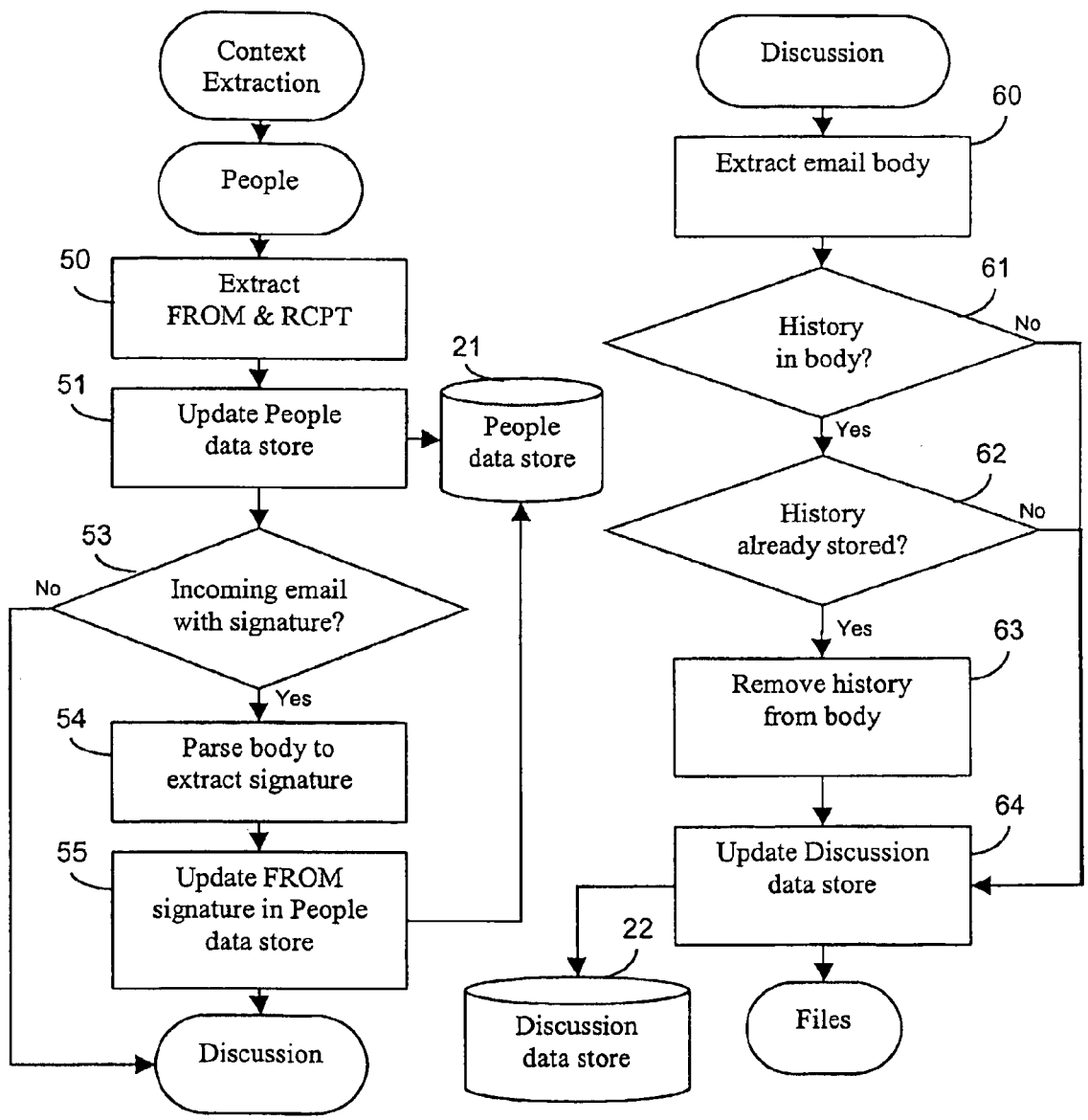
FIG. 5a to 5d are flowcharts describing respectively extraction of People (P), Discussion (D), Files (F), and Events (E) contexts from an e-mail at step 45 of FIG. 3.

FIG. 5a illustrates obtaining the People context according to the present embodiment. The People context extraction starts by obtaining user-specified elements of all e-mail addresses from the TO and/or CC and/or BCC fields (collectively the recipients or RCPT) as well as the FROM field (i.e. sender's e-mail address) at step 50. The extractor 15 then updates the People data store 21 to record these addresses in association with the e-mail at step 51. In the present embodiment, the People data store 21 is structured as a series of (Message-Id, Role, E-mail-Address, Attribute-List) tuples, where Message-Id is the unique id of the e-mail, Role is one of "FROM", "TO", "CC" or "BCC", E-mail-Address is an e-mail address, and Attribute-List is a list of (Attribute-Name, Attribute-Value) pairs.

In a variation, it is envisaged that the update step 51 comprises the steps of adding one tuple to the People data store (step 52) for the each e-mail address listed in the FROM, TO, CC and BCC fields, with the Message-Id assigned as the unique-id of the e-mail as computed in step (step 42), the Role assigned according to where the e-mail address appears in the FROM, TO, CC or BCC of the e-mail, the E-mail-Address assigned according to the e-mail address.

Further, according to another variation, additional information may be added to the tuple as (Attribute-Name, Attribute-Value) pairs whenever additional information is available. For an example, most e-mail clients (such as Microsoft Outlook) and e-mail servers (such as Microsoft Exchange) incorporate Personal Information Manager (PIM) functionalities, and often also perform e-mail-address-to-name resolution against the some internal contacts database or corporate directories. For example, this could result in an e-mail address such as john@bigcompany.com being resolved into "John Doe"<john@bigcompany.com> in the e-mail. For this example, the attribute-pair ("Name", "John Doe") may be added to the "john@bigcompany.com" tuple.

A further test is conducted to check if the e-mail is an incoming e-mail that also carries a signature (step 53). A signature is an e-mail netiquette practice of ending e-mails with a few lines of text providing the sender's contact information. If a signature is found, it is extracted and the attribute name-value pair ("Signature", signature) is added to the tuple for FROM e-mail address in the People data store (step 55).

2d. Discussion Context Extraction

FIG. 5b illustrates the Discussion context extraction process which begins by obtaining the user-specified elements of the main message body (i.e. content) of the e-mail at step 60. A test is then performed at step 61 to determine if history had been included in the e-mail body. A "history" is message or portions of messages from previous e-mails that is included in the body of the present e-mail. This is common when replying to or forwarding e-mails. Many e-mail clients provide various formatting options for history, such as pre-pending each line of prior message with a ">" string or a tab indentation and thus, it is possible to identify the presence of history by checking the message's formatting. If such history exists, then a second test is performed at step 62 to check if the history is already stored in the Discussion data store 22. If the history is already present, then the history is removed from the body before the e-mail's Discussion context is updated into the Discussion data store 22 at step 64. This is done to avoid duplication of message bodies in the Discussion data store 22.

At step 64, the extractor 15 also updates the Discussion data store 22 to record the e-mail exchange as a communication activity.

In the present embodiment, the Discussion data store 22 is structured as a series of (Message-Id, Subject, Date, Body-Locator, Attribute-List) tuples, where Message-Id is the unique id of the e-mail, Subject is the SUBJECT field of the e-mail, Date is the DATE field of the e-mail, Body-Locator is a file locator address or pointer that indicates where the actual e-mail body content can be found, and Attribute-List is a list of (Attribute-Name, Attribute-Value) pairs. This structure allows separation of the data store for the context data from the data store for the actual e-mail body content that is preferred for reasons of operational efficiency. For example, this allows use of different data store types that are optimum for the different data types. The Discussion data store may also benefit from storage and management in a relational database to exploit the highly-structured data and compactness of data store size for efficient processing, whereas the data store for e-mail body may benefit from storage and management in a file system to allow efficient storage and manipulation of large body of unstructured data. Another possible benefit is to avoid storage duplication as the e-mail body content may already be stored for processing by another systems, such as e-mail archives or corporate information systems.

In another embodiment, although not preferred, is to structure the Discussion data store 22 as a series of (Message-Id, Subject, Date, Body, Attribute-List) tuples, which is to use the Body tuple instead of the Body-Locator tuple. Similarly, Message-Id is the unique id of the e-mail, Subject is the SUBJECT field of the e-mail, Date is the DATE field of the e-mail, Body is the e-mail body, and Attribute-List is a list of (Attribute-Name, Attribute-Value) pairs.

As a variation, it is envisaged that the update step 64 may comprise the step of adding one tuple to the Discussion data store (step 65) for each e-mail, with the Message-Id assigned as the unique-id of the e-mail as computed in step (step 42), the Subject assigned as the text of the SUBJECT field of the e-mail, Date assigned as the DATE field of the e-mail, and the Body assigned according to possibly processed e-mail body.

2e. File Context Extraction

Figures 5C, 5D:
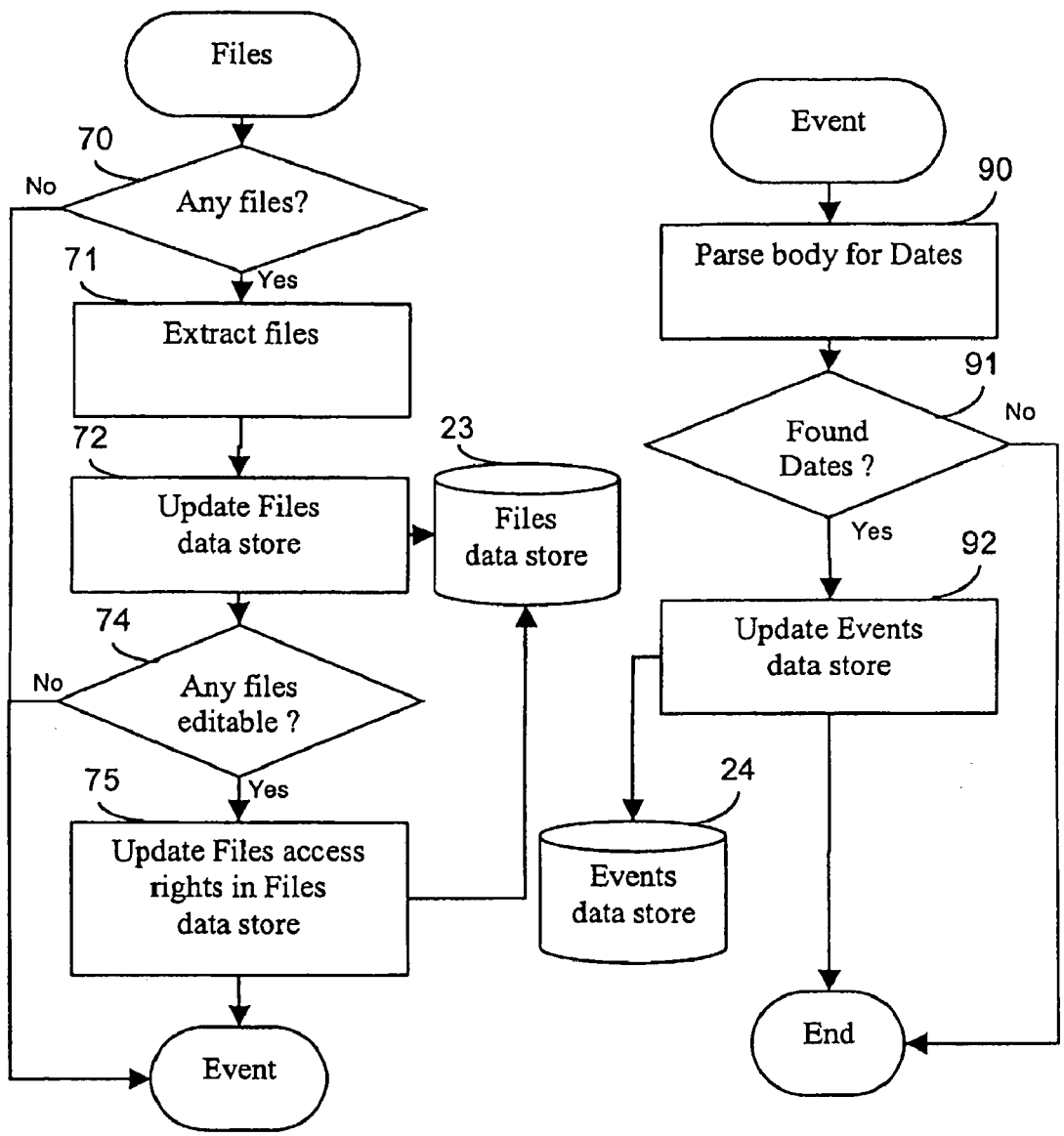

FIG. 5c illustrates the steps for obtaining the Files contexts according to the present embodiment. At step 70, the Files context extraction starts with a check to see if any file or file references are included in the e-mail. It should be apparent that this check may extend beyond just file attachments, and may include any references to files embedded in the e-mail body. Examples include the presence in the e-mail body of hyperlinks, or Universal Resource Identifier (URI) or any other file system protocols that allows the user to access information resources across a communication network. If such file attachments or references exist, then the extractor 15 extracts these attachments and/or references at step 71 and updates the Files data store 23 at step 72 to record the attachments and/or references association with the e-mail.

In the present embodiment, the Files data store 23 is structured as a series of (Message-Id, File-Locator, Attribute-List) tuples for each file attachment or reference extracted from the e-mail, where Message-Id is the unique id of the e-mail, File-Locator is a file locator address or pointer that indicates where the actual file attachment or file reference is found, and Attribute-List is a list of (Attribute-Name, Attribute-Value) pairs. This structure allows separation of the data store for the context data from the data store for the actual file attachments or references content and may be preferred for reasons of operational efficiency. For example, this allows the use of different data store types that are optimal for the different data types. The Files data store may also benefit from storage and management in a relational database to exploit the highly-structured data and compactness of data store size for efficient processing, whereas the data store for files may benefit from storage and management in a file system to allow efficient storage and manipulation of large amount of unstructured data. Another benefit may be to avoid storage duplication as the files may already be stored for processing by another system.

In another embodiment, the Files data store 23 is structured as a series of (Message-Id, File, Attribute-List) tuples for each file attachment or reference extracted from the e-mail instead of using the File-Locator tuple. Similarly, Message-Id is the unique id of the e-mail, File is the file attachment or reference found in the e-mail, and Attribute-List is a list of (Attribute-Name, Attribute-Value) pairs.

Similar to the earlier variations to the other context extractions, the update step 72 may comprise the step of adding one tuple to the Files data store 23 for each file attachment or reference found in the e-mail, with the Message-Id assigned as the unique-id of the e-mail as computed at step 42, and the File assigned according to the file attachment or file reference found in the e-mail. In addition, additional information may be added to the tuple as (Attribute-Name, Attribute-Value) pairs whenever additional information is available or desired to be captured. For example, step 74 may be added to check if the files obtained at step 71 are deemed to be editable file-types (e.g. Microsoft Office documents such as Word, Excel, PowerPoint etc) or non-editable file types (e.g. Adobe's Portable Document Format PDF documents). The system may then apply a heuristic rule that all e-mail addresses located in the e-mail's FROM, TO and BCC fields may be granted both Read-and-Write access rights to these files, with the other e-mail-addresses in the e-mail's CC fields granted only the default Read-Only access to these files. Further, to record information regarding the access-rights, for each file tuple in the Files data store, an additional attribute name-value pair (Read-Write, E-mail-Address) can be added for each e-mail-address in the FROM, TO and BCC fields, and an additional attribute name-value pair (Read-Only, E-mail-Address) can be added for each e-mail-address in the CC field (step 75).

2f. Events Context Extraction

FIG. 5*d* illustrates the steps of obtaining the Events contexts according to the present embodiment. At step 90, the Events context is obtained by scanning the e-mail body to identify dates or time-based references. A non-exhaustive list of examples of such references include "15 March", "Mar. 15, 2004", "15 of next month", "middle of next month", "next Thursday", "tomorrow" and "in two days". Relative time references (e.g. "next Thursday" or "in 2 days") are resolved to a specific date relative to the date in the e-mail's Date field. If such references are found at step 91, the extractor 15 updates the Events data store 24 at step 92 to record the date reference in the e-mail. Preferably, the Events data store 24 is structured as a series of (Message-Id, Date, Subject, Text-Window, Attribute-List) tuples for each date reference extracted from the e-mail, where Message-Id is the unique id of the e-mail, Date is a date reference found in the e-mail, Subject is the text in the Subject field of the e-mail, Text-Window is a portion of the e-mail body containing the date reference and Attribute-List is a list of (Attribute-Name, Attribute-Value) pairs.

Further, the update step (step 92) may comprise the steps of adding one tuple to the Events data store (step 93) for each date reference found in the e-mail, with the Message-Id assigned as the unique-id of the e-mail as computed in step 42 of FIG. 3, the Date assigned according to the extracted and resolved date reference found in the e-mail, Subject assigned according to the Subject field of the e-mail, Text-Window assigned according to a three-sentence portion of the e-mail body comprising the sentence preceding the sentence containing the said date reference in the e-mail, the sentence containing the date reference in the e-mail, and the sentence following the sentence containing the date reference in the e-mail.

Upon completion of obtaining the various user-defined elements, the system proceeds to associate each of the elements (i.e. People, Discussion, File and Events) to the respective data stores 21,22,23,24. Of course, this association can also be performed after each element is obtained and not necessarily until after all the elements are obtained.

2g. E-Mail Annotation

With reference to FIG. 3, once the e-mail contexts has been extracted in (i.e. step 45 is now completed), the system checks at step 46 to see if the user has assigned the e-mail to any Shared workspace as a Shared message. If the e-mail has not been assigned to a Shared workspace as a Shared message, the post-processing is completed and the e-mail is returned to proxy server module for transmission through the communications network.

If, however, the e-mail has been assigned to a Shared workspace as a Shared message, then the e-mail is annotated at step 47 to include the necessary additional information in order to facilitate shared access to the contextual workspace by recipients whose operating environment contains the required application modules illustrated in FIG. 1, henceforth referred to as Class 1 recipients, as well as recipients whose operating environments do not contain the modules of FIG. 1, henceforth referred to as Class 2 recipients. In the present embodiment, the necessary information is included as two annotations, one for each class of recipients.

For Class 1 recipients, information that is needed to allow these recipients' operating environment to recreate the resulting post-processing results is included as a first annotation. This first annotation includes the unique message ID of the outgoing e-mail that had been computed at step 42, and the list of Shared-Workspace- and Shared-Message assignments that had been made by the initiating user. This information, together with the e-mail, allows a Class 1 recipient to perform the required post-processing actions (similar to the sender) so that the recipient's local Workspace, People, Discussions, File and Events data stores are in the same state as the data stores of the sender with respect to the e-mail and the assigned workspaces.

Alternatively, it is envisaged that the first annotation includes the unique message id but instead contain a list of all tuples from Workspace, People, Discussions, File and Events data stores that contains the unique id of the said e-mail within the tuple. This information similarly allows the recipient's local Workspace, People, Discussions, File and Events data stores to record the e-mail in the same manner but without the need to perform the post-processing actions, although this increases the amount of information to be annotated and transmitted.

In both examples above, the first annotation can be added to the e-mail by encapsulating the e-mail as a standard multipart Multipurpose Internet Mail Extensions (MIME) message, or alternatively as a multipart Secure/Multipurpose Internet Mail Extensions (S/MIME) message, with the first annotation information included as a message part using a proprietary MIME Content-Type extension (e.g. application/x-workspace-annotation) that will only be understood and processed by Class 1 to recipients' system, while being ignored by Class 2 recipients' systems without any adverse impacts to the normal processing of the e-mail.

For Class 2 recipients, information that is needed to allow such recipients to access the same shared contextual workspace is included as a second annotation. This second annotation can be a hyperlink or Uniform Resource Identifier (URI) that permits access to the contextual workspace via the relay server of FIG. 2 over a communications network such as the World Wide Web. This will allow the targeted recipient access to the contextual workspace remotely via the World Wide Web. The second annotation may be added to the e-mail by directly appending the URI to the end of the e-mail body text.

At step 47 of FIG. 3, the preferred embodiment also proposes that the workspace name, to which the e-mail is being assigned to at step 41, is included in the e-mail for transmission to the recipient. As explained earlier; since the e-mail is preferably in the multipart MIME format, additional data (in this case, the workspace name) can be attached to the e-mail body in the form of an attachment or embedded within the first annotation field. This allows the e-mail to be suitably filtered by the recipient according to the workspace name, which will be discussed in detail under the heading "Collaborative e-mail filtering".

Upon annotating the e-mail, the post-processing process is completed and the annotated e-mail is returned to proxy server module 12 for transmission through the communications network 18.

3. Automated Workspace Update Through Pre-Processing of an Incoming E-Mail

A user (i.e. recipient) of the present system receives e-mails as per normal and this allows the recipient to continue the familiar work practice of using existing e-mail clients and e-mail servers. In FIG. 1, the e-mail received from e-mail server module (11) is relayed to proxy server module 12 which initiates the pre-processing actions by passing the incoming e-mail to the IN module 14 for processing.

Figure 6:
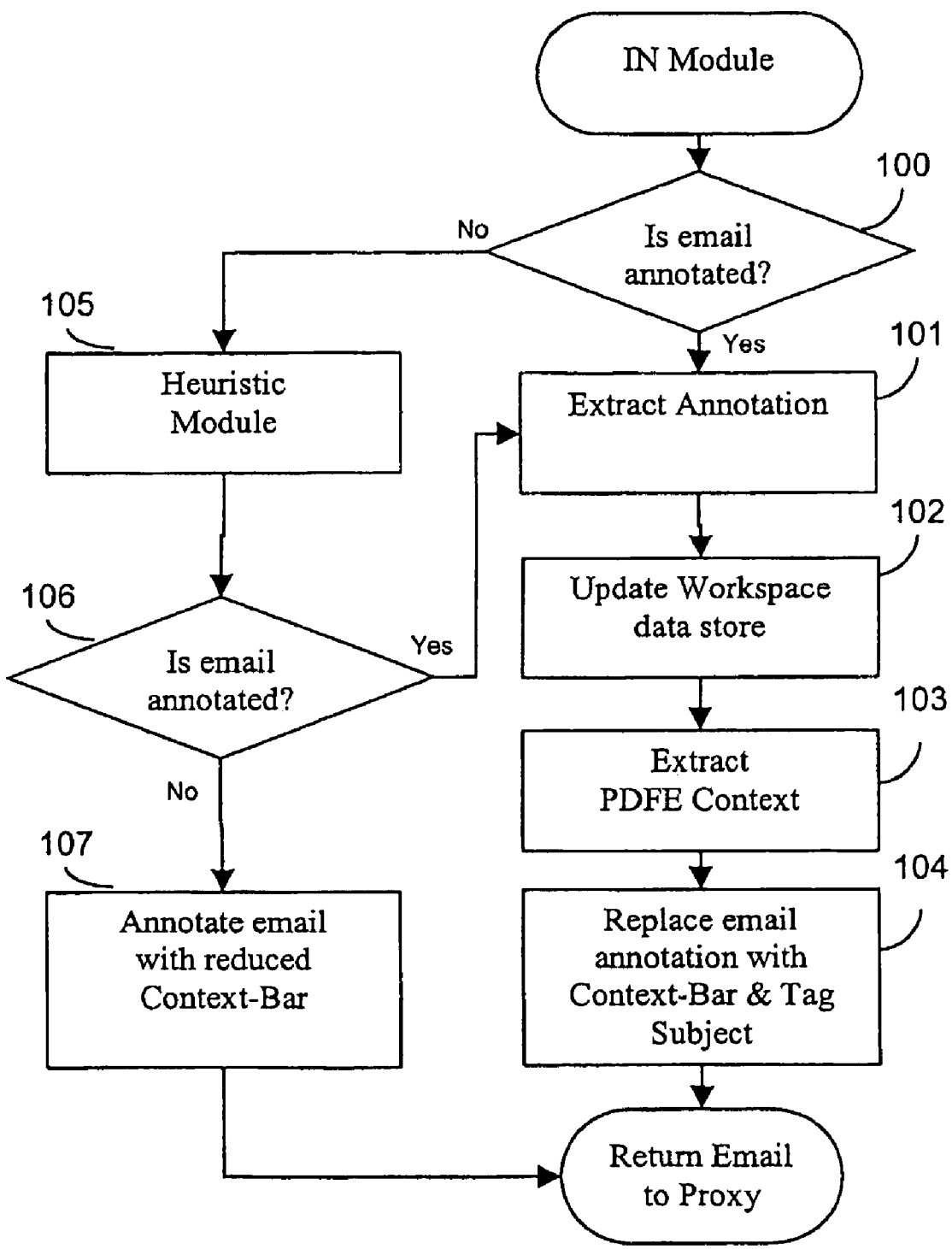
FIG. 6 is a flowchart describing a method for processing an incoming e-mail after it is received by the e-mail server module of FIG. 1.

FIG. 6 is a flow chart showing steps of processing the e-mail before transmitting the e-mail to the e-mail client module 10 for viewing by the recipient. At step 100, the system first checks if the received e-mail is annotated. This can be performed by checking if the incoming e-mail is a multipart MIME or S/MIME message, and if so, whether it contains the proprietary MIME or S/MIME content sub-type extension explained in step 47 of FIG. 3. If the e-mail is annotated, the system extracts the annotation at step 101 which allows the recipient's system to synchronise the contents of its data stores with the sender's data stores in terms of the incoming e-mail and the designated shared workspaces.

As explained earlier, the annotation may include the unique message id of the incoming e-mail, and the list of Shared-Workspace- and Shared-Message assignments that had been made by the sender of the e-mail. At step 102, the recipient's system updates the recipient's local Workspace data store with this information and the context of the received e-mail is then obtained at step 103 using the same process as step 45 of FIG. 3, with updates to the recipient's People, Discussion, Files and Events data stores. In this way, both the sender and recipient's data stores are in the same state. Finally, at step 104, the system prepares the incoming e-mail for display to the user via the e-mail client module, by removing the annotation information from the incoming e-mail, and instead appending a Context-bar directly to the end of the e-mail body. The Context-bar is a set of menu options located within the e-mail body that provides the recipient with access to the contextual workspaces and workspace management actions.

Figure 7A:
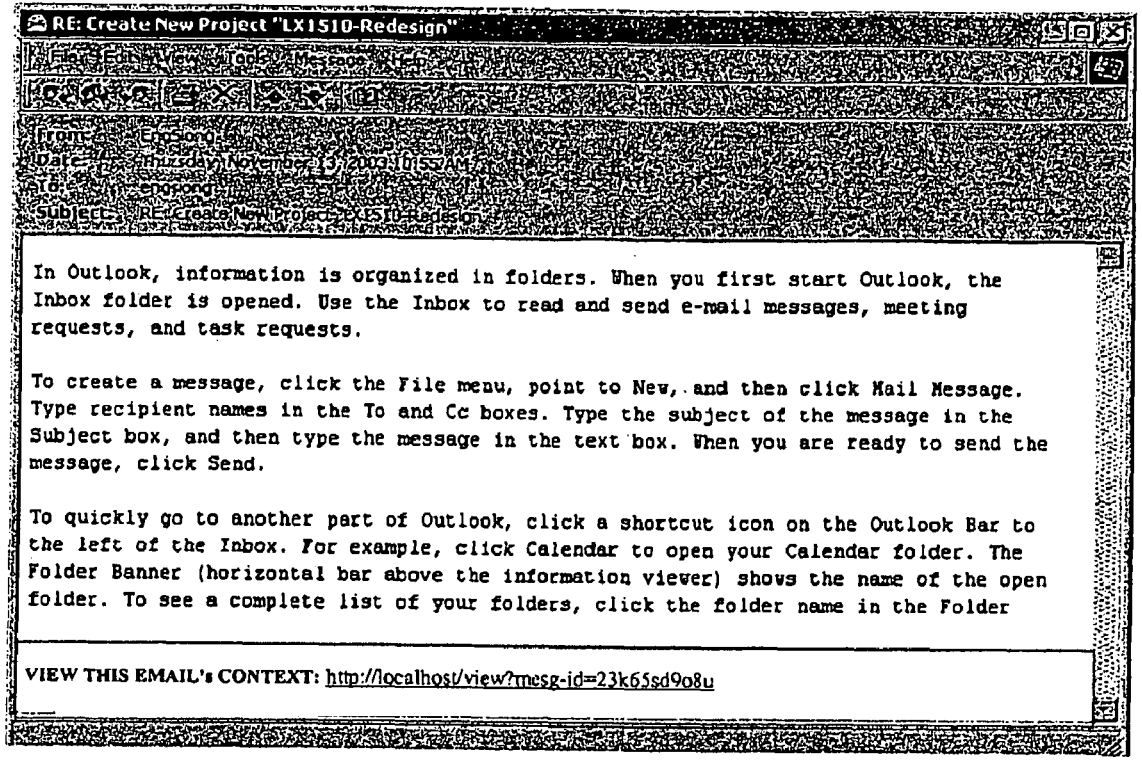
FIG. 7a illustrates an example of an annotated e-mail of a Class 1 recipient which has been assigned to one or more workspaces.

In the present embodiment, the IN module 14 of the system computes the Uniform Resource Identifier (URI) locations of dynamically generated webpages to display the list of workspaces of the e-mail and allow contextual management of these workspaces. The Context-bar is then simply a list of hyperlinks (textual hyperlinks, image buttons, or any linkable action item) to the URIs computed. FIG. 7a illustrates an example of the Context-bar comprising a hyperlink pointing to a webpage showing the e-mail's workspaces. Upon annotating the e-mail with the Context-bar, the pre-processing process is completed and the annotated e-mail is returned to proxy server module 12 for display via the client module to the user.

Figure 9:
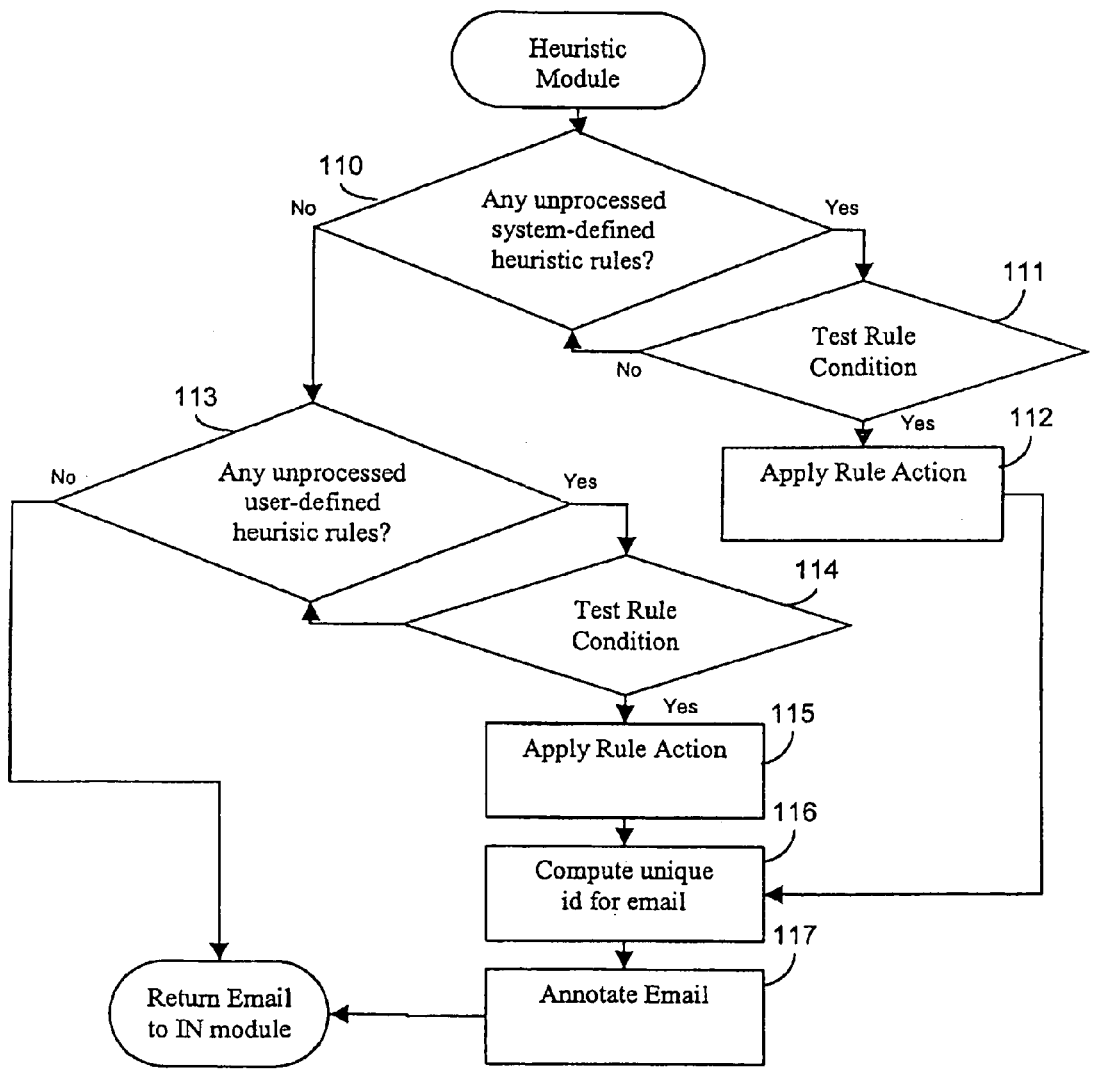
FIG. 9 is a flowchart illustrating a method for heuristic-processing an incoming non-annotated e-mail by the heuristic module of FIG. 6.

On the other hand, if at step 100 the system determines that the e-mail has not been annotated, a Heuristic module is called to apply a set of heuristic rules to automatically determine at step 105 if the non-annotated e-mail should still be assigned to workspaces. FIG. 9 shows the action steps of the heuristic module to process the non-annotated e-mail.

At step 110, the module begins by checking if any system-defined heuristic rules exist that has not been processed for this incoming e-mail. If there is, an unprocessed heuristic rule is selected for application. System-defined heuristic rules are preferably of the format "IF (TEST) THEN (ACTION)", where TEST represents truth conditions (i.e. true or false) to be checked, and where ACTION represents computations to be taken to compute a set of workspaces to assign the incoming e-mail to. An illustration of a possible system-defined heuristic rule is given here:

Example system-defined heuristic rule 1:

IF (e-mail SUBJECT has format "RE:" or "FWD:" followed by Text) AND (at least one tuple exists in Discussions data store whose "Subject" field matches Text)

THEN (collect the set of unique-ids from "Message-Id" fields of all tuples in Discussions data store whose "Subject" field matches Text), (collect the set of workspace-names from "Workspace-Name" fields of all tuples in Workspace data store whose "Message-Id" field matches an id in the set of unique-ids collected), (assign e-mail to the set of workspace-names collected).

where the TEST of this heuristic checks if the incoming e-mail has previously is a reply or a forwarding of earlier e-mails that had already been assigned to one or more workspaces, and the ACTION computes all the workspaces that those earlier e-mails belongs to, and assigns the incoming e-mail to these workspaces.

Another example of a possible system-defined heuristic rule is given here:

Example system-defined heuristic rule 2:
IF
   (collect the set of unique-ids from the "Message-Id" fields of all tuples in People data store whose "E-mail-Address" field matches the e-mail's FROM field) AND
   (collect the set of workspace-names from "Workspace-Name" fields of all tuples in Workspace data store whose "Message-Id" field matches an id in the set of unique-ids collected) AND
   (check that only one unique workspace-name exists in the set collected).
THEN
   (assign e-mail to the workspace-name collected).
where the TEST of this heuristic checks if the incoming e-mail is from one email address whose emails both sent-to and received-from has always been assigned to just one workspace, and the ACTION assigns the incoming e-mail to that same workspace.

Referring again at FIG. 9, if the heuristic module finds an unprocessed system-defined heuristic rule at step 110, the module checks its TEST at step 111. If the TEST returns true, the rule is applied to the e-mail at step 112 and a unique id is computed for the incoming e-mail at step 116. Next, the received e-mail is annotated at step 117, mirroring the post-processing steps 42 and 47 of FIG. 3 and the heuristic processing ends.

However, if the TEST returns false at step 111, the module returns to step 110 to find the next unprocessed system-defined heuristic rule.

When all system-defined heuristic rules have been processed, the system begins a similar process for user-defined heuristic rules. In one embodiment, user-defined heuristic rules are structured similarly to the system-defined heuristic rules, and are of the format "IF (TEST) THEN (ACTION)". The difference is that users can defined dynamic and highly personalized rules to suit their individual operating environments. Illustrations of possible user-defined heuristic rules are given here:

Example user-defined heuristic rule 1:
IF
   (e-mail FROM matches "ceo@mycompany.com") OR
   (e-mail FROM matches "vp*@mycompany.com")
THEN
   (assign e-mail to the workspace "BOSSES").
Example user-defined heuristic rule 2:
IF
   (e-mail SUBJECT matches "Xanadu")
THEN
   (assign e-mail to the workspace "Project Xanadu").
Example user-defined heuristic rule 3:
IF
   (e-mail FROM matches "john@companyA.com") OR
   (e-mail FROM matches "eric@companyB.com") OR
   (e-mail FROM matches "mark@companyC.com")
THEN
   (assign e-mail to the workspace "Soccer Team").

It should be clear from the above that users can have much flexibility in defining heuristic rules that are specific and peculiar to their situations.

If at step 113, the module finds an unprocessed user-defined heuristic rule, the module checks its TEST at step 114. If the TEST returns true, the rule is applied to the e-mail at step 115 and a unique id is computed for the incoming e-mail at step 116. Next, the incoming is annotated at step 117.

However, if the TEST returns false at step 114, processing returns to step 113 to find the next unprocessed system-defined heuristic rule. When all user-defined heuristic rules have been processed, and no system-defined nor user-defined rules have been found to be applicable to this incoming e-mail, the heuristic processing ends without annotating the incoming e-mail, and the process exits.

Figure 7B:
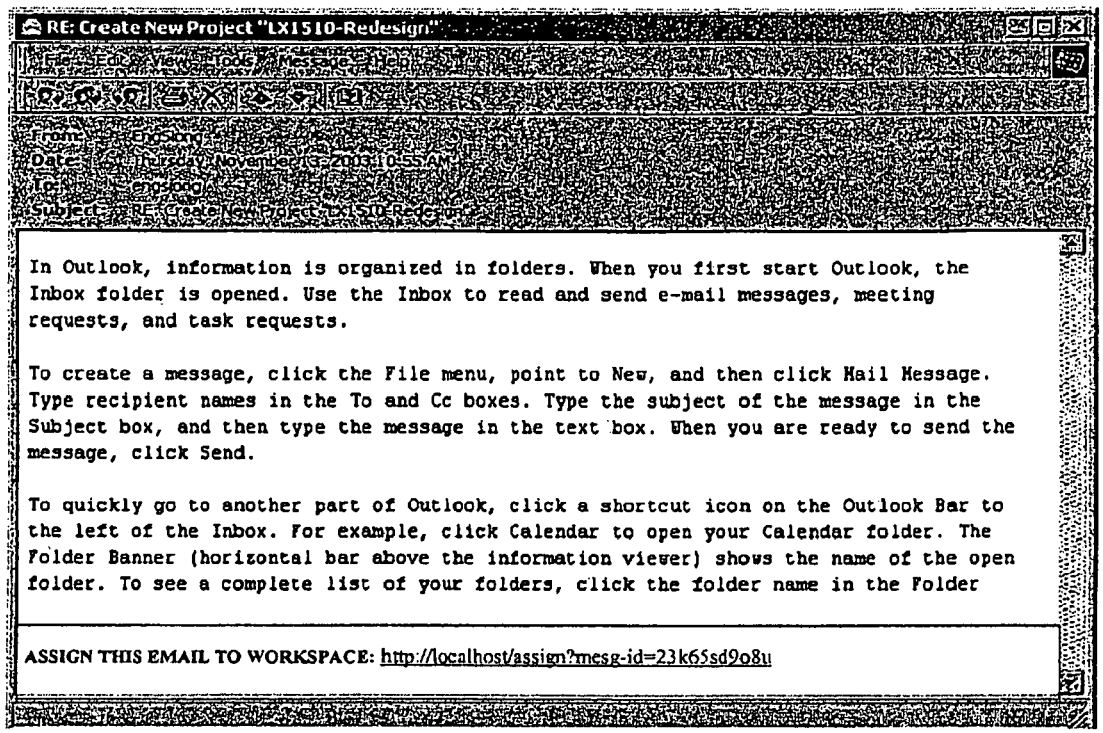
FIG. 7b illustrates an example of an annotated e-mail of a Class 1 recipient which has not been assigned to any workspace.

With reference to FIG. 6, upon completion of the heuristic processing at step 105, the system checks at step 106 to determine if the e-mail have been annotated as a result of applying the heuristic rules. If the e-mail has been annotated, the process continues to step 101 and processing continues as described above through step 104 until the e-mail is returned to the proxy server module. If at step 106, the system determines that the e-mail is still not annotated, then the e-mail is annotated with a reduced Context-bar at step 107 which is simply a hyperlink containing an URI for a webpage that allows workspace assignment, an example of which is illustrated in FIG. 7b. This allows the recipient to include and contextually manage e-mails that are sent by Class 2 individuals. Upon annotating the e-mail with the Context-bar, the pre-processing process is completed and the annotated e-mail is returned to proxy server module for display to the user.

4. Collaborative E-Mail Filtering

An important advantage of updating workspace through the post-processing of outgoing e-mails and pre-processing of incoming e-mails is that the e-mails assigned to workspaces are collaboratively filtered as a by-product.

During the pre-processing (i.e. step 104 of FIG. 6), incoming e-mails that have been annotated can have their Subject field specially tagged, in addition to having the annotation replaced by the Context-bar. The tagging comprises a first step of generating identifying tags for the e-mail based on the workspaces assigned to the e-mail, for example, by concatenating the Workspace-Names of each workspace assigned to the e-mail since the workspace name is also transmitted together with the e-mail to the recipient, as explained earlier. The tagging is required to separate the identifier from the true "subject" heading, and in this embodiment, the tags "[*[" and "]*]* are used.

The next step of the pre-processing is to replace the Subject field of the e-mail with a new Subject field composed from the original Subject string followed by the concatenation of "[*[", the tag generated in the first step, and "]*]". The resulting e-mail, with the specially tagged Subject and appended Context-bar, is then passed on to the Proxy for display to the user in the e-mail client.

Figure 8A:
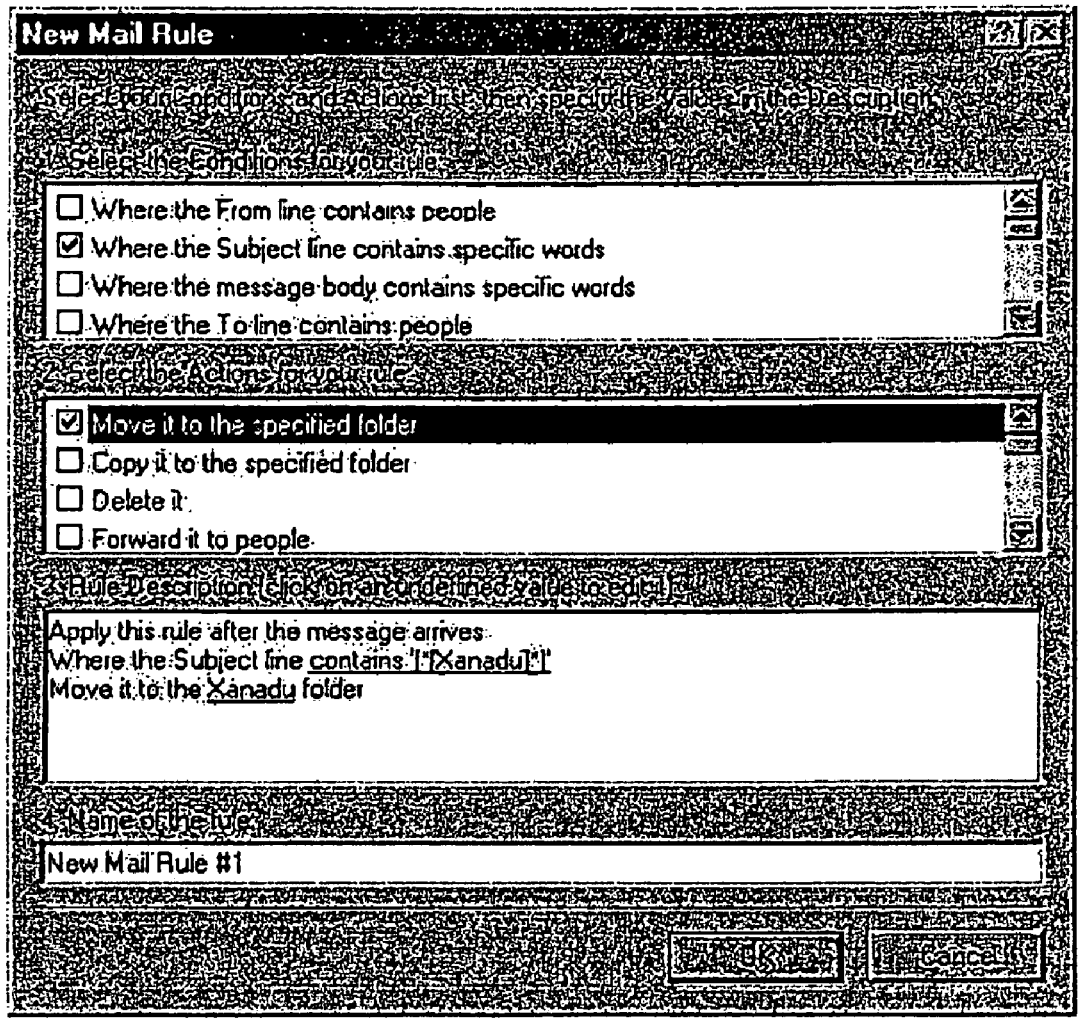
FIG. 8a illustrates constructing an e-mail filtering rule in Microsoft Outlook Express for filtering e-mails that has been specially tagged by the pre-processing of an incoming e-mail.
Figure 8B:
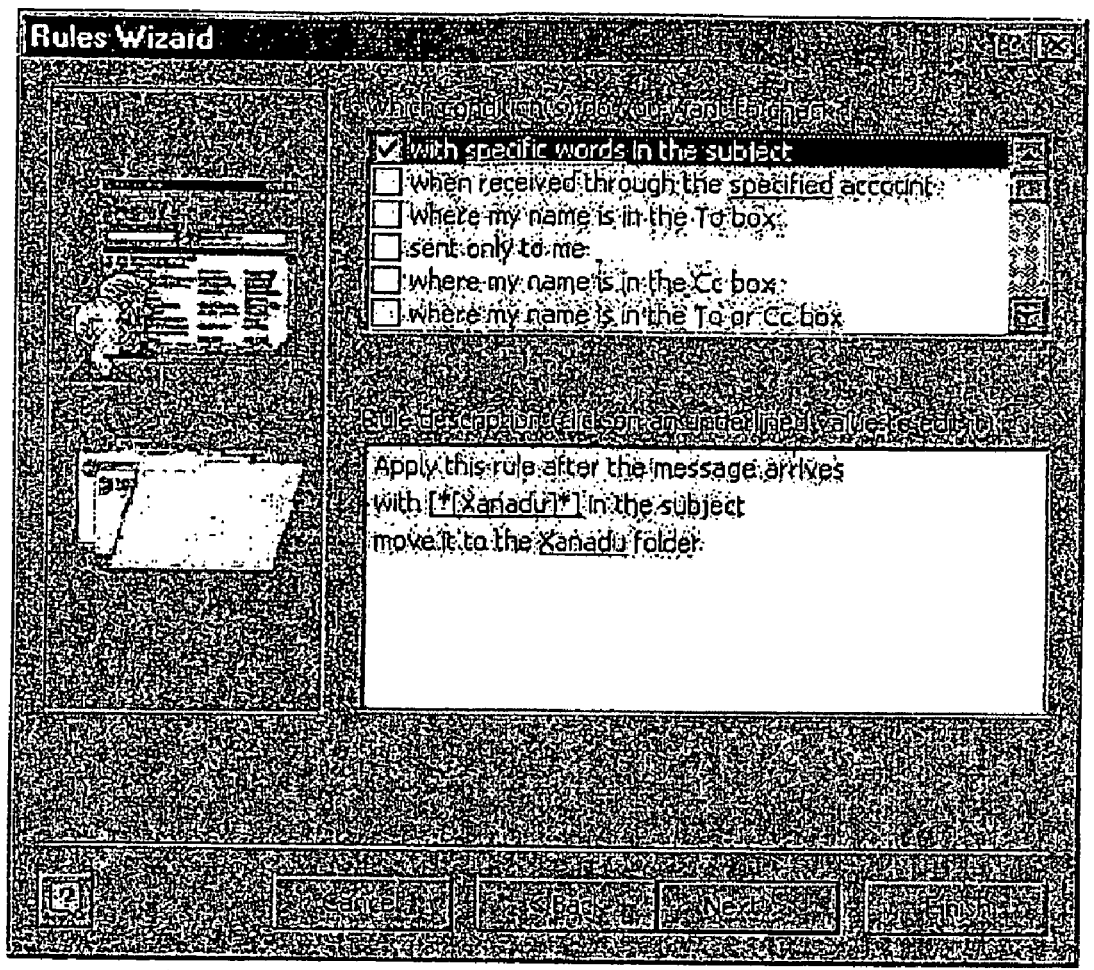
FIG. 8b is an illustration of constructing an e-mail filtering rule in Microsoft Outlook for filtering e-mails that has been specially tagged by the pre-processing of an incoming e-mail.

Once the e-mail is received at the e-mail client module 10, the e-mail client can be instructed to look for such specially tagged e-mails and filter them off the main inbox into folders for each workspace. In one embodiment of the invention, e-mail filtering rules can be readily added to modern e-mail clients, such as Microsoft Outlook, Microsoft Outlook Express, Lotus Notes and Eudora, to automatically filter off such specially tagged e-mails into a separate folder. FIGS. 8a and 8b illustrate the adding of such e-mail filtering rules using features already provided for in Microsoft's Outlook Express and Outlook respectively. Such filtering rule first checks for the special tags in the Subject field (in this example, the tag is Xanadu as suitably concatenated as described above) for each new incoming e-mail, and once detected, the rule acts to copy or move the specially tagged e-mails to a folder labelled with workspace name. As a result, all e-mails that have been assigned to workspaces can be automatically filtered off the main inbox into folders according to the workspace it has been assigned to.

Thus, it will be appreciated that the recipient's tag is derived from the workspace name and provides a unique text pattern so that filtering rules can pick out such emails for further processing (for example, directing to a pre-defined folder). The tag can also be used truncate a very long workspace name to avoid the very annoying side effect of a tag always obscuring the actual Subject when viewed in the email clients.

5. Contextual Workspace Management

As explained above, a Class 1 user can receive and read annotated and regular e-mails as per normal, without any additional steps required for setup or registration into workspaces, with the only difference is that all e-mails will now be annotated with the Context-bar (as shown in FIGS. 7a and 7b). The function and placement of the Context-bar allows the recipient to consider taking additional actions only upon the normal work-practices of browsing and reading the e-mail.

Figure 7C:
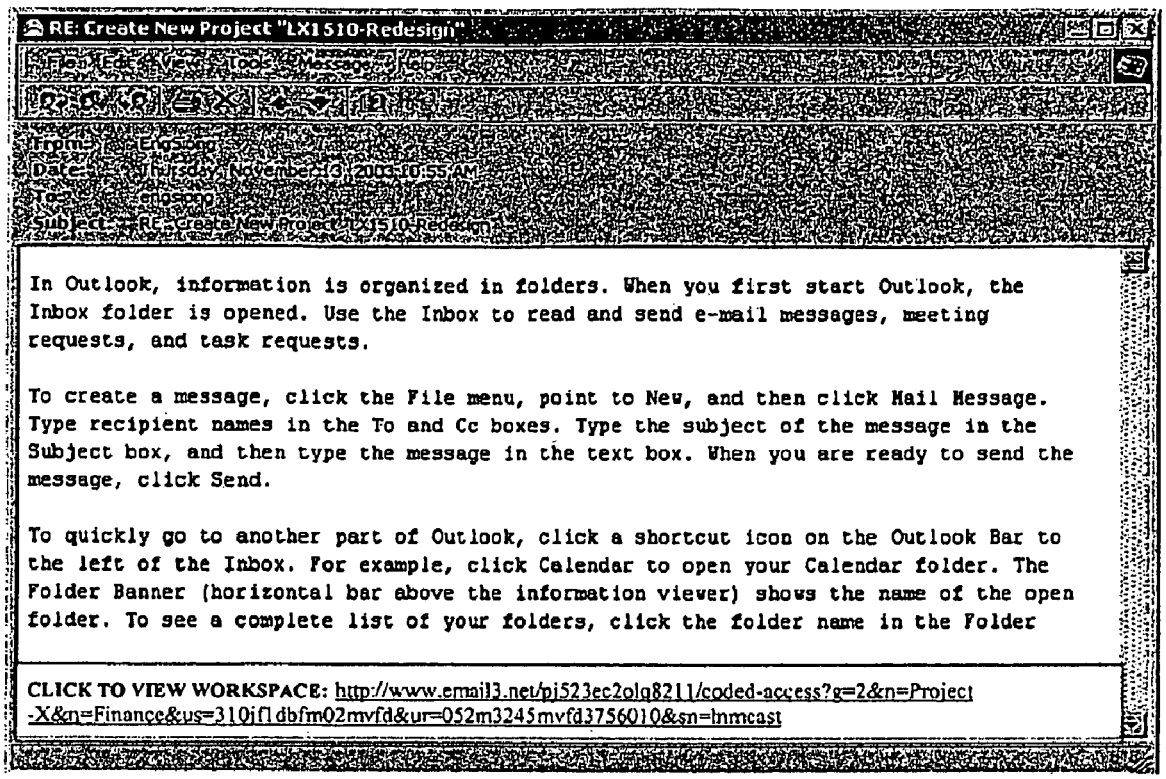
FIG. 7c illustrates an example of an annotated e-mail of a Class 2 recipient which has been assigned to one or more workspaces.

An important aspect of this invention is its ability to work for both Class 1 and Class 2 recipients. Even Class 2 recipients, whose operating environment does not have the required application modules can still gain partial shared access to contextual workspace. FIG. 7c shows an illustration of an e-mail as viewed by a Class 2 recipient that has been assigned to one or more workspaces by the sender and whose Context-bar comprises one hyperlink for accessing the assigned workspace. The hyperlink's actual URI is different since access to the workspace for Class 2 recipients are provided over a remote relay server, whereas Class 1 recipients may access their workspace from local servers.

Figure 10:
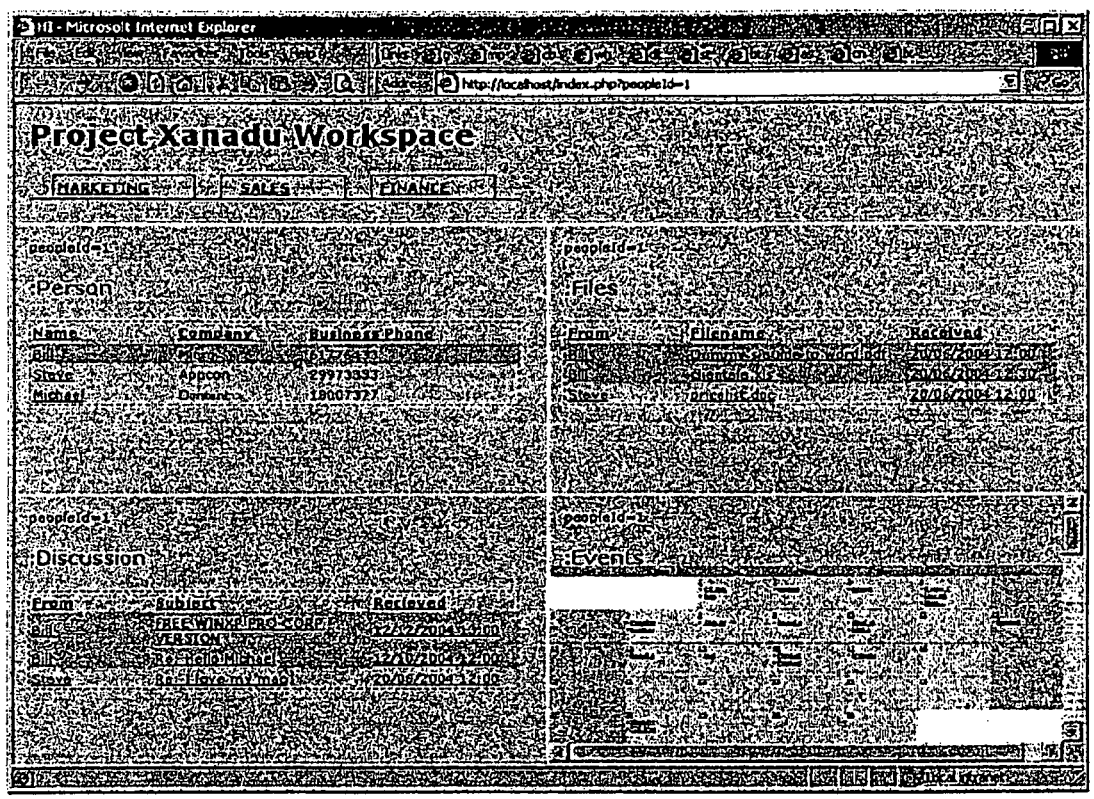
FIG. 10 illustrates a user interface displaying People-Discussion-Files-Events context views for the contextual management of the workspace.

Regardless of whether it is accessed locally by Class 1 recipients or remotely by Class 2 recipients, the same workspace information is provided that supports contextual access to all collaboration activities. Such activities include data stores and tools for communication, information-sharing, member management and events coordination. FIG. 10 shows an example of the user interface for the contextual workspace named "Xanadu" organised as a four-view window showing simultaneously the People, Discussions, Files and Events data groups related to the workspace and with each user-defined element (obtained earlier by the context extractor 15) associated with respective data groups.

The People view is a list of all members of the workspace obtained from a plurality e-mails assign to this workspace. In one embodiment, members are listed by e-mail address, contact attributes. Contact attributes may be any contact-type data about the member; examples include name, company, phone, fax, instant messaging id, other e-mail aliases, address, birthday, name of spouse etc. In another embodiment, the People view may additionally include contextual People attributes. Contextual People attributes represent a significant aspect of this invention, and are dynamically computed data about the member, and may reflect actual aggregated or contextual collaborative behaviour by the member in this workspace. An example of a contextual People attribute is "strength of discussion contribution" to measure degree of the member's contribution to discussions in this workspace, and can be a number between 0.0 and 1.0 computed from the ratio of the number of e-mail discussions in the workspace initiated or replied-to by the member, to the total number of e-mail discussions in the workspace.

Another example of a contextual People attribute is "awareness of files updates" which is a measure of how up-to-speed the member is with the files in the workspace and their revisions. This attribute can be a number between 0.0 and 1.0 computed from the ratio of number of the most recent (latest version) files that had been accessed for reading or modifications by the member, to the total number of files accessible to the member in the workspace. Yet another example of a contextual People attribute is "frequency of events next week" to measure how many events the member is involved in for the upcoming work-week in the workspace. This measure can be a number greater than or equal to 0 computed from the number of events the member is associated with in the next seven days. Any of the contact or contextual People attributes can be displayed as optional columns in the People view for user perusal. In addition or alternatively, these attributes can be used for computational purposes elsewhere in the system, e.g. use in the heuristic rules computations in FIG. 6, step 105.

The contextual People attributes may be further personalized, that is, the contextual People attribute is computed relative only to the recipient and does not apply to other users in the workspace. An example of a personalised contextual People attribute relative to the recipient is "degree of collaboration" to measure how closely a user (i.e. the sender) has collaborated specifically with the recipient of an e-mail. Such an attribute can be a number between 0.0 and 1.0 computed from a ratio of the communication messages exchanged between the user (being the sender) and the recipient, to the recipient's total number of communication messages. To obtain the number of communication messages between a specified user, for example user "A", and a recipient, for example user "B", the system (specifically the workspace engine 16) performs a search in the People data store 21 to identify a first set of tuples with user A's e-mail address indicated under the "E-mail address" field and also named in the "FROM" field (since user A is the sender). The workspace engine 16 then retrieves the message identifiers from this first set of tuples (these message identifiers being associated with all the mail messages that have been sent by "A" within the workspace).

To identify all these mail messages, the workspace engine 16 then performs another search in the People data store 21 to identify a second set of tuples which contains the retrieved message identifiers (since tuples belonging to the same message will have the same identifier). Thus, the second set of tuples will be associated with those mail messages that have been sent by user A. To obtain the number of mail exchanges between users A and B, The workspace engine 16 then performs a search within the second set of tuples to identify those tuples which have user B's e-mail address named in the "TO" e-mail address. The number of unique message IDs within this third set of tuples represents the number of mail messages from "A" to "B". A similar process is used to obtain the number of mail messages from "B" to "A". The sum of these two numbers is the numerator of the ratio. To determine the denominator, the same is performed for the user B's e-mail address (i.e. recipient) to identify first the e-mail ID associated with that address before identifying user B's total number of communication messages.

Another example of a personalised contextual People attribute relative to the recipient is "degree of follow-up" to measure how well a member has responded to the recipient's communications, and in one embodiment may be a number between 0.0 and 1.0 computed from the averaging of two ratios. The first ratio is the ratio of the number of communication messages sent from the recipient to the user to which the user has replied to, over the total number of communication messages sent from the recipient to the same user. The second is the ratio of the number of files sent from the recipient to the user that the user has accessed for reading or modification, over the total number of files sent from the recipient to same user. Similarly, the message ID is used to obtain the required numbers to form the ratio. It should be apparent that other ways of computing People attributes are possible.

The Discussion view is a list of all communications messages assigned to the workspace, integrating both e-mail and instant messages organised by threads, i.e. messages are grouped by Subject together with replied and forwarded messages. The view may integrate a variety of message types, such as e-mail and instant messaging, and combines all incoming and outgoing messages in a single view, unlike most e-mail clients that offer mainly Inbox and Outbox views separately. The threaded discussions are listed by message attributes and contextual Discussion attributes. Message attributes may be the FROM, TO, CC, DATE fields of the communication message. Contextual Discussion attributes are dynamically computed data about the thread. An example would be to highlight discussions whose sender is currently online.

The Files view is a list of all files assigned to the workspace, listed by filenames, file attributes and contextual File attributes. File attributes may include file type, version number, file size, date of creation, author, list of users who accessed the file and time of access etc. Contextual File attributes are dynamically computed data about the file, and may reflect actual aggregated or contextual collaborative behaviour by the user in this workspace. An example is highlighting files that have not been opened by the people that it had been sent to.

The Events view is a list of all events assigned to the workspace, listed by Date, event attributes and contextual Event attributes. Event attributes may include event title, event initiator, event participants, event description etc. Contextual Event attributes are dynamically computed data about the event, and may reflect actual aggregated or contextual collaborative behaviour by the users of the workspace. An example would be highlighting events for which at least one invited recipient who has not yet to open the e-mail to which the event relates.

The system also supports a single-search-propagate-to-all-views contextual search and navigation, beyond the contextual attributes specific to each view (e.g. contextual People attributes in the People view). Contextual search and navigation are manifested in the workspace display by actively linking the four views together during user browsing and search activities. When one or more members are selected, or returned as search results in the People view, the Discussion view will correspondingly highlight those messages for which the said members are involved as senders or recipients. Similarly, the Files view will correspondingly highlight those files for which the said members are authors or co-authors, and the Events view will correspondingly highlight those events for which the said members are initiators or participants.

Likewise, when one or more messages are selected, or returned as search results in the Discussion view, the People view will correspondingly highlight those members who are involved as senders or recipients in the said messages, the Files view will correspondingly highlight those files which are attachments or references in the said messages, and the Events view will correspondingly highlight those events which originated from date references in the said messages.

Likewise, when one or more files are selected, or returned as search results in the Files view, the Discussion view will correspondingly highlight those messages for which the said files are involved as attachments or referenced in the message, the People view will correspondingly highlight those members who are authors or co-authors of the said files, and the Events view will correspondingly highlight those events for which the said files are attached or referenced.

Likewise, when one or more events are selected, or returned as search results in the Events view, the Discussion view will correspondingly highlight those messages from which the said events are extracted due to date references in the messages, the People view will correspondingly highlight those members who are initiators or participants in the said events, and the Files view will correspondingly highlight those files which are attached to or referenced by the said events.

Figure 11:
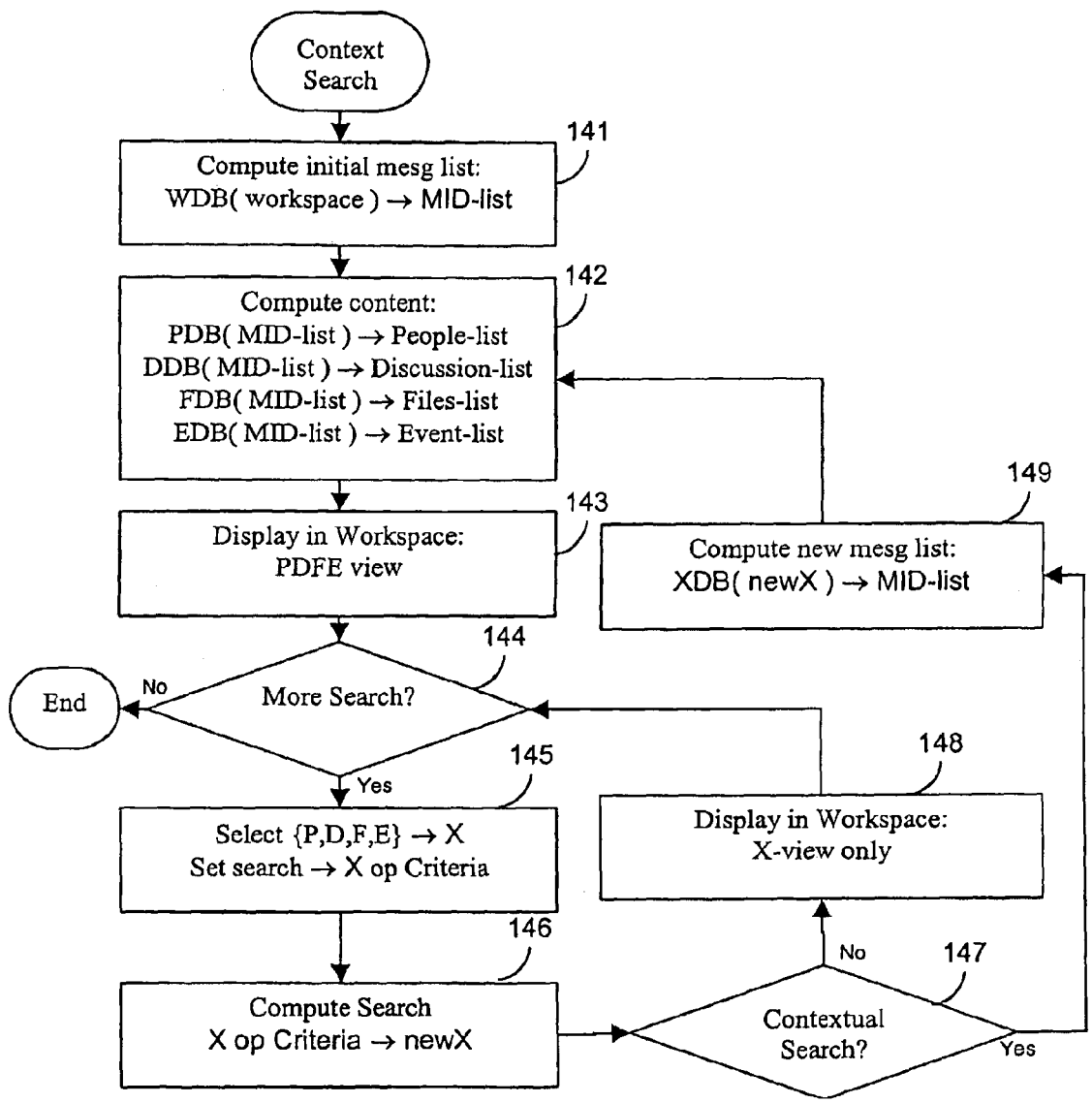
FIG. 11 is a flowchart depicting the algorithm for contextual search and navigation of the workspace upon receiving a user search request.

FIG. 11 shows in detail how contextual workspace search is performed using a navigation algorithm of the present embodiment.

Given the workspace name, at step 141, the process begins with querying the Workspace data store ("WDB") to obtain the list of the unique ids of all messages ("MID-list") assigned to the workspace. This MID-list is then used to query:

a) the People data store ("PDB") to obtain the list of member's tuples associated with the messages ("People-list"),
b) the Discussion data store ("DDB") to obtain the list of discussion tuples associated with the messages ("Discussion-list"),
c) the Files data store ("FDB") to obtain the list of file tuples associated with the messages ("Files-list"), and
d) the Event data store ("EDB") to obtain the list of event's tuples associated with the messages ("Event-list") (step 142).

The query results are input into the workspace's user-interaction engine for rendering and display to the user at step 143. Whenever user search or selection request is detected at step 144, the search query is first formulated at step 145 as X op Criteria, where "X" is the tuple-list from one of People, Discussion, File or Event views, "op" is one of AND or OR, and "Criteria" is the user-specified criteria. The search is computed and the resulting tuple-list designated "newX" as shown at step 146.

Step 147 allows the user to specify if the search is a single-view-only search or a propagate-to-all-views contextual search. If only a single-view-only search is requested, then only the view being searched is updated using the search results tuple-list newX for generating display results at step 148. If, however, a propagate-to-all-views contextual search is requested, then an intermediate step is required to compute the new message list. MID-list is updated with the collection of the unique ids from "Message-Id" field of all the tuples in newX (step 149). Processing then returns to step 142 where the newly updated MID-list is then used to re-query all the four data stores to re-generate the new members, discussion, files and events tuples for a display update in step 143. The process continues until the user stops searching and navigating, and exits from the system.

6. Data Synchronization

The operating environments of a plurality of users can be interconnected with one another via a network of relay server operating environments (FIG. 2) that can be located remotely from any user. The relay servers provides a relay station to facilitate data synchronisation between the plurality of users' operating environments that may not be connected via a common communications network at all times. Data synchronisation is required periodically between users with shared workspaces to ensure an accurate mirror state of the data stores relative to the shared workspaces. While the automated management of post-processing and pre-processing will keep data stores synchronised between senders and recipients of the managed e-mails, other members of the workspace not on the e-mail's TO, FROM, CC or BCC list will need data synchronisation through the relay servers.

Data synchronization occurs between the synchronisation engines 17 (FIG. 1) of each user's operating environments, via a communication network, and the system synchronisation engine 38. (FIG. 2) of the relay servers. Synchronisation can occur at specific events (e.g. when the user logs onto the system), at regularly schedule intervals or on user-demand. Prior art exists for the data synchronisation such as the PumaTech's IntelliSync™ or the Rsync™ open source incremental synchronisation tool. Preferably, all the synchronisation engines maintain a globally synchronised time stamp. For each data synchronisation, the synchronisation engine 17 (FIG. 1) at the user's operating environment sends a synchronisation request to the system synchronisation engine 38 (FIG. 2) which comprises time of last synchronisation event and a list of workspaces being shared. The system synchronisation engine checks the system data stores to check if changes had occurred for the named workspaces since the last synchronisation. If there are no changes, a "No Synchronisation Needed" message is sent and the process ends. Otherwise, the list of changes since the last synchronisation are extracted from the system stores, compressed and encoded and sent back to the user's synchronisation engine. Upon receipt, the user's synchronisation engine acknowledges, decompresses and decodes the changed data and performed data synchronisation with the local data stores. Conflicts that are detected (e.g. a file that has both been modified remotely and locally at the same time) are recorded for user notification and manual resolution.

The user's synchronisation engine then extracts the changes of the local data store with those received from the system synchronisation engine, and performs a similar extraction, compression and encoding for transmission to the system synchronisation engine. The system synchronisation engine acknowledges receipt of the data and synchronises the user's change data into the system data stores. Other optimisations are possible and can be incorporated into the system.

7. Inclusive Design for Class 2 Users

The relay servers in FIG. 2 also exists to provide a remote workspace engine to provide Class 2 users (users whose operating environment does not include the required modules of FIG. 1) to still gain access to the contextual workspace access and management.

When a Class 1 user sends a Class 2 user a managed e-mail, Class 1 user's operating environment will annotate the e-mail with a URI pointing at a dynamically generated webpage located on the relay server (FIG. 3, step 47). When the Class 2 user receives the annotated e-mail from the Class 1 user, and clicks on the annotated URI link, the Class 2 user is directed to a web page hosted at the remote relay server via a communications network 39 (see FIG. 2) through the system workspace engine 37 (FIG. 2) which accesses the system data stores 31, 32, 33, 34, 35 in the relay server. As the system data stores 31, 32, 33, 34, 35 of the relay server will be synchronised with the local data stores 20, 21, 22, 23, 24 from a Class 1 user through the user's synchronisation engine 17 (FIG. 1), the Class 2 user will be able to view the same workspace display as that from the Class 1 user. Subsequent contextual search and navigation by the Class 2 user can continue through the system workspace engine 37 of the relay server via communications network 39.

Thus, the described embodiment proposes a method and system that identifies, obtains and manage relationships between the main elements of the workspace, such as people, discussions, files and events, and to provide processing to exploit this relations to facilitate subsequent user access to workspace information, through aggregation, contextual search and navigation for inter both intra- and inter-views. It also allows a plurality of different e-mails to be assigned to the same workspace as long as the e-mails belong to the same project (as can be defined by a user).

Further, with collaborative filtering, the proposed method also address e-mail spam problem through a collaborative effort in user assignments of various e-mails to workspaces that allows users to share effort to provide high-quality manual filtering while sharing the workload among workspace group members and without requiring any one user to bear the filter effort for every e-mail assigned to the workspace.

The described embodiment should not be construed as limitative. For example, the user-defined elements (i.e. the actual data) associated with the respective data stores 20,21, 22,23,24 may not necessarily be stored locally in the sender or recipient's computer system. The elements may be stored in a storage location remote from the sender or recipient's computer system.

The collaborative e-mail filtering describes using the workspace name as an identifier for classifying the e-mail but it is envisaged that the identifier can also be based on other subject matters, for example, information from one of the user-defined elements of the e-mail. Also, the creation of a tag to follow the subject field is described in the preferred embodiment as being performed at the recipient. However, it is also envisaged that the tag can be created by the sender prior to the transmission of the e-mail.

The communications network 18 may also be in the form of an Intranet or other forms of WAN.

Having now fully described the invention, it should be apparent to one of ordinary skill in the art that many modifications can be made hereto without departing from the scope as claimed.

The invention claimed is:

1. A method of populating a collaborative workspace with a plurality of user-specified elements of an electronic mail message, the method comprising the steps of:
   (i) assigning the electronic mail message to a collaborative workspace based on the said mail message, the workspace including a plurality of data groups accessible by a sender and/or one or more recipients of the electronic mail message;
   (ii) automatically identifying and obtaining each user-specified element of the plurality of user-specified elements from the electronic mail message;
   (iii) automatically associating each user-specified element with a said data group to enable the sender and/or the one or more recipients to collaborate on the user-specified elements;
   (iv) generating an unique message identifier using an input derived from content of the electronic mail message for identifying the electronic mail message; and
   (v) storing the identifier in association with each user-specified element after each user-specified element has been associated with the data group, and wherein each user-specified element associated with the respective data group is linked together contextually via the message identifier.

2. A method according to claim 1, further comprising the step of transmitting the electronic message over a communications network to the one or more recipients after step (iii).

3. A method according to claim 2, wherein the assigning step is performed at a recipient computer system local to the one or more recipients of the electronic message after the electronic message is received by the recipient computer system.

4. A method according to claim 3, further comprising the step of, prior to the transmission at the sender's computer system, annotating the electronic mail message with a first annotation field which allows the recipient computer system to automatically assign the received electronic mail message to a collaborative workspace local to the recipient computer system upon receipt of the electronic mail message at the recipient computer system, the said workspace having a plurality of data groups with each user-specified element of the electronic message being automatically associated with a said data group.

5. A method according to claim 4, further comprising the step of replacing the first annotation field of the electronic message with a context bar for directing the one or more recipients of the electronic message to the local collaborative workspace containing the user-specified elements, the context bar being viewable together with the electronic message by the one or more recipients.

6. A method according to claim 5, wherein the context bar includes a hyperlink pointing directly to the collaborative workspace.

7. A method according to claim 5, further comprising the step of prompting the one or more recipients to select whether to assign the electronic message to a selected workspace or to create a new workspace for assigning the electronic message, if the heuristic rules cannot automatically determine that the message is to be assigned to a collaborative workspace.

8. A method according to claim 4, further comprising, prior to the assigning of the electronic message to the collaborative workspace at the recipient computer system, checking automatically whether the electronic message is annotated with the first annotation field.

9. A method according to claim 8, further comprising the step of applying a set of heuristic rules to the received electronic message to automatically determine whether the message is to be assigned to a workspace, if the electronic message is not annotated with the additional information.

10. A method according to claim 9, further comprising the steps of automatically identifying and obtaining selective user-defined elements of the electronic mail message, and checking whether the selected user-defined elements has been previously assigned to an existing workspace, and assigning the electronic mail message to the existing workspace if the heuristic rules determines that the selected user-defined has already been previously assigned.

11. A method according to claim 9, wherein the heuristic rules are defined by the one or more recipients of the electronic mail message.

12. A method according to claim 4, further comprising the steps of, prior to the transmission, annotating the electronic mail message with a second annotation field at the sender's computer system which allows recipients unable to create the local collaborative workspace based on the first annotation field to still collaborate the user-specified elements based on the second annotation field.

13. A method according to claim 12, wherein the second annotation field includes a hyperlink to direct the one or more recipients to a website remote from the recipient computer system and which hosts the collaborative workspace to enable the one or more recipients to still collaborate on the user-specified elements.

14. A method according to claim 4, wherein the local collaborative workspace is an existing workspace.

15. A method according to claim 4, further comprising the step of creating a new collaborative workspace based on the first annotation field and wherein the electronic mail message is assigned to the newly created collaborative workspace.

16. A method according to claim 3, further comprising the step of generating a filtering identifier based on the assigned workspace of the electronic message, and annotating the filtering identifier to a selected user-specified element of the electronic message.

17. A method according to claim 16, further comprising the step of filtering the electronic message to appropriate electronic mail client folders based on the filtering identifier for retrieval and viewing by the one or more recipient.

18. A method according to claim 16, wherein the selected user-specified element is a subject field of the electronic mail message, and the filtering identifier is annotated to the subject field.

19. A method according to claim 2, wherein the communications network is the Internet.

20. A method according to claim 2, wherein the communications network is the Intranet.

21. A method according to claim 1, wherein the workspace is an existing workspace.

22. A method according to claim 21, wherein the existing workspace or the newly created workspace is stored in a computer system local to the sender of the electronic message.

23. A method according to claim 22, wherein the assigning step is performed at the computer system local to the sender of the electronic message.

24. A method according to claim 23, further comprising the step of prompting the sender of the electronic message to select whether to assign the electronic message to a workspace, prior to the assigning step.

25. A method according to claim 23, wherein the plurality of data groups includes a people data group and step (iii) further comprises the step of associating the addresses of the one or more recipients with the people data group.

26. A method according to claim 22, wherein the plurality of user-specified elements includes electronic mail addresses of the one or more recipients.

27. A method according to claim 1, wherein the plurality of user-specified elements includes a message body of the electronic mail message.

28. A method according to claim 27, wherein the message body includes new text yet to be associated with the discussion data group and old text already associated with the discussion data group, the method further comprising the steps of identifying and obtaining the new text, and associating the new text with the discussion data group.

29. A method according to claim 28, wherein the identifying step comprises checking the format of the message body to identify the new and old text in the message body.

30. A method according to claim 27, wherein the plurality of user-specified elements includes hyperlinks contained in the message body of the electronic message.

31. A method according to claim 30, wherein the plurality of data groups includes a file data group, and step (ii) further comprises the step of associating the hyperlinks with the file data group.

32. A method according to claim 27, wherein the plurality of user-specified elements includes time and/or date information in the message body of the electronic message.

33. A method according to claim 32, wherein the plurality of data groups includes an event data group, and step (ii) further comprises the step of associating the time and/or date information with the event data group.

34. A method according to claim 27, wherein the plurality of data groups includes a discussion data group, and step (iii) further comprises the step of associating the message body of the electronic mail message with the discussion data group.

35. A method according to claim 1, wherein the workspace is categorised as a shared workspace in which the user-defined elements within the workspace can be collaborated on by the sender and one or more recipients of the electronic mail message, and a private workspace in which the data groups within the work space can be collaborated on only by the sender of the electronic message, and the method further comprises the step of:
   selecting whether to assign the electronic message to a shared workspace or to a private workspace.

36. A method according to claim 35, further comprising the step of selecting whether to categorise the electronic mail message as a shared message within a said shared workspace in which the user-defined elements can be collaborated on by the sender and the one or more recipients, or as a private message within a said shared workspace in which the user-defined elements can be collaborated on only by the sender of the electronic mail message.

37. A method according to claim 1, wherein the plurality of user-specified elements includes files attached to the electronic message.

38. A method according to claim 37, wherein the plurality of data groups includes a file data group, and step (iii) further comprises the step of associating the files with the file data group.

39. A method according to claim 1, further comprising a plurality of electronic mail messages, and wherein the method further comprises the step of assigning each electronic mail message to respective collaborative workspaces according to subject matter of the electronic messages.

40. A method according to claim 39, wherein a said message identifier of an electronic message is associated with the plurality of data groups of a said workspace to which the electronic message is assigned.

41. A method according to claim 1, wherein step (i) further comprises the step of creating a new collaborative workspace, the electronic mail message being assigned to the new workspace.

42. A method according to claim 1, further comprising the step of associating the identifier with the workspace to which the electronic message is assigned.

43. A method according to claim 1, wherein each data group in the workspace are viewable simultaneously by the sender and/or the one or more recipient of the electronic mail message.

44. A method according to claim 1, wherein the plurality of data groups is associated with a data storage arranged to store the plurality of user-defined elements associated with respective ones of the plurality of data groups.

45. A method according to claim 1, wherein the assigning step is performed automatically.

46. A method of managing a collaborative workspace assigned with a plurality of electronic mail messages, each mail message having a plurality of user-specified elements, the workspace having a plurality of data groups with each user-specified element being associated with a said data group, the method comprising the steps of:

(i) generating an unique message identifier using an input derived from content of the electronic mail message for identifying the electronic mail message, and (ii) storing the identifier in association with each user-specified element of the said electronic message after each user-specified element has been associated with the data group, and wherein each user-specified element associated with the respective data group is linked together contextually via the message identifier.

47. A method according to claim 46, further comprising the steps of selecting a said user-specified element, and automatically obtaining the message identifier stored in association with the selected user-specified element and identifying the rest of the user-specified elements which has the same message identifier.

48. A method according to claim 46, further comprising the steps of
   selecting first said user-specified element within a workspace,
   automatically obtaining corresponding message identifiers stored in association with the first said user-specified element, and
   identifying a first list of mail messages within the workspace which are associated with each of the corresponding message identifiers.

49. A method according to claim 47, further comprising the steps of:
   identifying a second said user-specified element,
   determining the presence of the second user-specified element in the first list of mail messages;
   identifying a second list of mail messages based on the presence of the second user-specified element in the first list of mail messages; and
   obtaining a number of different message identifiers in the second list of mail messages.

50. A method according to claim 46, wherein the plurality of user-specified elements includes electronic mail addresses of a sender and/or of one or more recipients of the electronic mail message, a message body of the electronic mail message, files attached to the electronic message, and time and/or date information in the message body of the electronic message.

51. A method of processing an electronic mail message to be sent from a sender to a recipient, the method comprising the steps of:
   (i) prompting the sender to select or create a filtering identifier to associate with the electronic mail message,
   (ii) transmitting the identifier in association with the electronic mail message, and
   (iii) assigning the electronic message to a collaborative workspace having a plurality of data groups prior to the transmitting step (ii), the plurality of data groups being accessible by the sender and/or the recipient, and wherein the identifier is in the form of the workspace's name.

52. A method according to claim 51, wherein the electronic mail message includes a plurality of user-specified elements, each element being associated with a said data group to enable the sender and/or the recipient to collaborate on the user-specified elements.

53. A method according to claim 51, wherein the identifier is tagged to a subject field of the electronic mail message.

54. A non-transitory computer-readable medium on which is stored a program module comprising instructions which, when executed by a computer, perform the method according to claim 1.

55. A computer implemented system for providing a collaborative workspace based on an electronic mail message having a plurality of user-specified elements, the system comprising:

an assigning device configured to assign the electronic mail message to a collaborative workspace having a plurality of data groups accessible by a sender and/or one or more recipients of the electronic mail message;

an identification module arranged to automatically identify and obtain each user-specified element of the plurality of user-specified elements, an associating device configured to automatically associate each user-specified element to a said data group;

an enabling device configured to enable the sender and/or the one or more recipients to collaborate on the user-specified elements;

an identification generator for generating an unique message identifier using an input derived from content of the electronic mail message for identifying the electronic mail message; and a storage device configured to store the identifier in association with each user-specified element after each user-specified element has been associated with the data group, and wherein each user-specified element associated with the respective data group is linked together contextually via the message identifier.

\* \* \* \* \*